(12) United States Patent
Ogura et al.

(10) Patent No.: US 7,558,171 B2
(45) Date of Patent: Jul. 7, 2009

(54) OPTICAL DISC RECORDING/PLAYBACK APPARATUS

(75) Inventors: Youichi Ogura, Ibaraki (JP); Toshihiko Takahashi, Kawachinagano (JP); Hiroaki Hayashi, Nara (JP); Teruhiko Izumi, Hirakata (JP); Dai Ichiryu, Hirakata (JP); Shinichi Konishi, Nara (JP)

(73) Assignee: Panasonic Corporation, Osaka (JP)

( * ) Notice: Subject to any disclaimer, the term of this patent is extended or adjusted under 35 U.S.C. 154(b) by 784 days.

(21) Appl. No.: 11/269,586

(22) Filed: Nov. 9, 2005

(65) Prior Publication Data

US 2006/0109770 A1    May 25, 2006

(30) Foreign Application Priority Data

Nov. 9, 2004    (JP) .............................. 2004-325575

(51) Int. Cl.
*G11B 15/52*    (2006.01)
(52) U.S. Cl. ................................. 369/47.51; 369/59.21
(58) Field of Classification Search .................. None
See application file for complete search history.

(56) References Cited

U.S. PATENT DOCUMENTS 6,144,516 A * 11/2000 Takeda et al. ................. 360/75

FOREIGN PATENT DOCUMENTS

WO    01/08143    2/2001

* cited by examiner

*Primary Examiner*—Paul Huber
(74) *Attorney, Agent, or Firm*—Wenderoth, Lind & Ponack, L.L.P.

(57) ABSTRACT

An optical disc recording/playback apparatus is provided with a first AD converter 35 for shaping a push-pull signal 14 detected from an optical disc medium 1 by a light difference signal shaping circuit 21, and converting the signal into a digital sampling signal 38 using a sampling clock 37 synchronized with a channel frequency; a series of means for detecting wobble amplitude information 77 during recording from the digital sampling signal 38; a series of means for detecting address polarity information 60 and address position information during playback; and a recording laser power control circuit 113 for controlling a recording laser power to a power suited for recording on the basis of the wobble amplitude information.

21 Claims, 23 Drawing Sheets

Fig.12

| VFO1 | AM | PID1 | IED1 | PA1 | VFO2 | AM | PID2 | IED2 | PA2 | VFO1 | AM | PID3 | IED3 | PA1 | VFO2 | AM | PID4 | IED4 | PA2 |
|---|---|---|---|---|---|---|---|---|---|---|---|---|---|---|---|---|---|---|---|
| 36 | 3 | 4 | 2 | 1 | 8 | 3 | 4 | 2 | 1 | 36 | 3 | 4 | 2 | 1 | 8 | 3 | 4 | 2 | 1 |

| Header1 | | | | | Header2 | | | | | Header3 | | | | | Header4 | | | | |

OPTICAL DISC RECORDING/PLAYBACK APPARATUS

FIELD OF THE INVENTION

The present invention relates to an optical disc recording/playback apparatus for performing recording and playback of digital data in/from an optical recording medium. More particularly, the invention relates to a technique for recording digital data in a recordable optical disc in which wobbles exist along tracks, and a technique for recording or playing digital data in/from a DVD-RAM (Digital Versatile Disk-Random Access Memory) in which CAPA (Complementary Allocated Pit Addressing) exists.

BACKGROUND OF THE INVENTION

As optical disc media (information recording media), a compact disc (registered trademark; hereinafter referred to as a CD) and a digital versatile disk (hereinafter referred to as a DVD) have been frequently employed. In recent years, not only a read-only optical disc, but also a writable DVD-Random Access Memory (hereinafter referred to as a DVD-RAM), a write-once DVD-Recordable (hereinafter referred to as a DVD-R), and a DVD-Rewritable (hereinafter referred to as a DVD-RW) have attracted attention.

The DVD-RAM disk is characterized by that it is able to perform recording and playback by random access, and therefore, it is suitable as a DVD recorder and an information storage medium. Further, during recording and playback in/from the DVD-RAM disk, the cycle of a reading clock during playback and the cycle of a writing clock during recording are controlled with reference to wobbles that are carved at regular intervals along recording tracks on the DVD-RAM disk as shown in FIG. 23(a), and a laser power for recording is controlled to a power suitable for recording of normal data on the basis of wobble amplitude information that is the amplitude value of a wobble signal component, in order to ensure the quality of recorded data even when flaws or stains are present on the recording surface. As a typical application of this technique, there is ROPC (Running Optimum Power Control) that is used when recording data on a recordable optical disc such as a CD-R (Compact Disc-Recordable). The principle and means thereof are specifically described in "CD-WO System Description Ver.2.0. Further, address information (Complementary Allocated Pit Addressing: hereinafter referred to as CAPA) of an embossed area has previously been recorded on the DVD-RAM disc as shown in FIG. 23(a), and the address information detection capability is one of factors that determine the random-access performance and the recording/playback performance.

Hereinafter, a description will be given of a wobble amplitude information detection method, a recording laser power appropriate control method, and an address information detection method of the conventional DVD-RAM disk recording/playback apparatus.

FIG. 24 is a block diagram illustrating the conventional DVD-RAM disk recording/playback apparatus.

With reference to FIG. 24, optical pickup 3 performs recording and playback of digital data into/from an optical disc medium which is a means for holding the digital data. The optical pickup 3 comprises a laser generation circuit 4 comprising a semiconductor laser; a four-split photodetector 5 for generating a tracking error signal, which receives a light beam outputted from the laser generation circuit 4 and reflected at an optical disc medium 1, and converts the power of the optical beam into an electric signal; and a two-split photodetector 6 for generating a focus error signal. Further, the optical pickup 3 is mounted on a transfer stage (movable stage) which is movable in the direction of the radius of the optical disc medium 1, and performs a focus servo for focusing the light beam outputted from the laser generation circuit 4 onto the tracks formed on the optical disc medium 1 through an objective lens as shown in FIG. 2, and a tracking servo for controlling the light beam to scan the tracks, according to a control command which is supplied from an optical disc controller 16 through an optical pickup driving circuit 18. In addition, the optical pickup 3 performs an operation for seeking a target address by moving the transfer stage in the direction of the radius of the optical disc medium.

The optical disc medium 1 has plural tracks extending along the circumference thereof. As shown in FIG. 3(a), each track is divided into sectors as units of data recording, and each sector has, at its beginning, an address area (CAPA area) in which an address for identifying the sector is recorded. Further, each sector has a data area in which playback data are stored, which data area follows the CAPA area. Immediately after the CAPA area, i.e., between the CAPA area and the data area, there is provided a gap area in which no data to be played exist and no data to be played are stored. The optical disc medium 1 is rotated at a predetermined rotation speed by an optical recording medium rotation control circuit 2, and data are recorded thereon according to the power of the light beam outputted from the laser generation circuit 4.

I/V converters 7 to 10 are current-to-voltage converters for converting the detected currents outputted from the four-split photodetectors 5a to 5d into voltages. An adder 11 adds the output voltage from the I/V converter 7 and the output voltage from the I/V converter 10 to add the components outputted from the areas 5a and 5d of the four-split photodetector 5, which are parallel to the track direction. An adder 12 adds the output voltage from the I/V converter 8 and the output voltage from the I/V converter 9 to add the components outputted from the areas 5b and 5c of the four-split photodetector 5, which are parallel to the track direction. The output signal from the adder 11 and the output signal from the adder 12 are input to a light difference signal detection circuit 13. The light difference signal generation circuit 13 adjusts the amplitude balances of the output signals from the adders 11 and 12, respectively, and subtracts the output of the adder 12 from the output of adder 11 to generate a push-pull signal (light difference signal) 14. The push-pull signal 14 is input to a wobble amplitude detection circuit 158. On the other hand, since the push-pull signal 14 includes a high frequency component, only a low frequency component of the push-pull signal 14 is detected by a low-pass filter (hereinafter referred to as LPF) 15 so as to treat the signal in a servo band, and the filtered signal is input to an optical disc controller 16 as a tracking error signal 17.

I/V converters 116 and 117 are current-to-voltage converters for converting the detected currents outputted from the two-split photodetectors 6a and 6b into voltages. A playback signal detection circuit 118 adds the output voltages from the I/V converters 7 to 10 which are the full output component from the four-split photodetector 5 and the output voltages from the I/V converters 116 and 117 which are the output component from the two-split photodetector 6, thereby generating a playback RF signal 119. The playback RF signal 119 is input to a signal processing circuit 159. The signal processing circuit 159 removes a high frequency noise component from the playback RF signal 119 by an equalizer and boosts a high frequency area of the RF component to improve the jitter of the playback RF signal, and performs slicing by a symbolic center level of the recorded digital data while controlling a playback clock synchronized with the clock component existing in the signal using a PLL (Phase Locked Loop) circuit, thereby demodulating a binarized signal 160.

A wobble amplitude detection circuit 158 detects a frequency component in which the tracks on the optical disc medium 1 wobble at a predetermined frequency, from the inputted push-pull signal 14, and detects an envelope with an analog signal processing circuit to output it as a wobble amplitude signal to a low-speed analog-to-digital converter 161. The low-speed analog-to-digital converter 161 converts the signal supplied from the wobble amplitude detection circuit 158 into a digital signal, and outputs the digital signal to a reflected light control circuit 162.

The reflected light control circuit 162 obtains a laser power suited to recording on the basis of variations in the inputted wobble amplitude signal, and controls the power of the laser outputted from the laser generation circuit 4 to the power suited to recording via a driving circuit 163. The driving circuit 163 receives a fundamental recording pulse 114 for recording target digital data, which is outputted from the optical disc controller 16, and generates a recording laser power control signal 115 as shown in FIG. 3(d) according to a command outputted from the reflected light control circuit 162. The laser power of the laser generation circuit 4 changes according to the recording laser power control signal 115.

The optical disc controller 16 performs generation of various control signals required for the optical disc recording/playback apparatus such as a focus servo for focusing the light spot of the laser beam outputted from the laser generation circuit 4 through the optical pickup drive circuit 18, a tracking servo for performing position control so that the light spot scans the tracks, seek operation for random access, and rotation control for the optical disc medium 1 using the optical recording medium rotation control circuit 2, as well as processings such as encoding and decoding of the recorded digital data, on the basis of the tracking error signal 17, the binarized signal 160 demodulated from the playback RF (Radio Frequency) signal 119 (described later), the address polarity information 60 extracted from the CAPA area, and the address position information 61. The optical disc controller 16 mentioned above is an optical disc controller disclosed in International Application No. WO01/08143 (Patent Document 1), and it includes a servo microcomputer, a control microcomputer, a recording information generation circuit, a recording waveform generation circuit and the like (refer to description corresponding to FIG. 2 disclosed in Patent Document 1).

Hereinafter, with reference to FIGS. 3(a)-3(d), a description will be given of an operation for controlling the recording laser power to an optimum value, when defects due to flaws and stains exist on the recording surface of the optical disc medium 1.

As shown in the figure, the light spot moves along the track. In FIG. 3(a), an elliptical shaded area is a defect area due to flaws or stains. FIG. 3(b) shows a recording gate signal 19 in which "H" indicates the recording state while "L" indicates the playback state. In the playback state where the recording gate signal 19 is "L", the power of the laser outputted from the laser generation circuit 4 is changed to a power suited to playback. FIG. 3(c) is a timing chart illustrating change in the wobble amplitude signal, i.e., change in the power of the reflected light from the optical disc medium 1, which change occurs when the light spot obtained by focusing the light beam on the track scans the track shown in FIG. 3(a). If the defect exists in the data area, the power of the reflected light, is lowered from level Pr0 to level Pr1 when the light spot passes over the defect. FIG. 3(d) is a timing chart schematically showing the level change in the emission power of the laser, i.e., the laser power, which is controlled by the above-mentioned laser power control method. The dotted lines in the vertical direction shown in FIG. 3 show the temporal relationships among the position of the light spot, the timing chart of the power of the reflected light shown in FIG. 3(c), and the timing chart of the laser power shown in FIG. 3(d), when the light spot is positioned in the respective areas shown in FIG. 3(a).

With reference to FIG. 3(d), in period T1 during which the light spot passes the gap area, the laser generation circuit 4 performs test emission for low-speed power switching. During this test emission, in the example shown in FIG. 3(d), two values of powers, power Pkt and power Pbt, are emitted, thereby performing fundamental optimum control for the laser power when performing recording that depends on temperature change or the like (refer to the description corresponding to FIG. 1 of Patent Document 1).

When the period T1 where the test emission is carried out is ended, the light spot enters the data area T2. In this period, as shown in FIG. 3(d), light emission is carried out such that high-speed switching is carried out among three values of powers (Pk, Pb1, Pb2) for performing accurate recording. These three values of powers are obtained by an emission light control circuit which is not shown in FIG. 24 (refer to the description corresponding to FIG. 1 of Patent Document 1).

When the light spot is passing over the defect, the power of the optical output or the laser is partially scattered or absorbed by this defect, whereby the power deviates from the optimum power for recording digital data on the optical disc medium 1. As a result, the power level of the reflected light from the optical disc medium 1 is lowered from the power Pr0 in the case where no defect exists, to the power Pr1. In response to this reduction, the loss in the level of the power of the reflected light due to the defect is detected from the wobble amplitude signal in period T3 during which the light spot crosses the detect, and the laser power is controlled to compensate this loss.

Using the circuits mentioned above and the operations thereof, it is possible to control the laser power to an appropriate value so as to improve the recording quality of the digital data against change in the envelopment such as temperature, and partial change due to flaws and stains.

Next, a description is given of an operation of detecting address information in the DVD-RAM disk.

In order to detect address information in the DVD-RAM disk, it is necessary to input the push-pull signal 14 into an address information detection circuit 59 for detecting such as address polarity information 60 and address position information 61. The address information detection circuit 59 detects the position of the front-side CAPA (front CAPA) as address polarity information 60 on the basis of the push-pull signal 14 shown in FIG. 23(b) and the threshold level shown by the upper dotted line in FIG. 23(b), and detects the position of the rear-side CAPA (rear CAPA) as address polarity information 75 on the basis of the push-pull signal 14 shown in FIG. 23(b) and the threshold level shown by the lower dotted line in FIG. 23(b). Further, the address information detection circuit 59 adds (OR operation) the address polarity information 60 and the address polarity information 75 to generate address position information 61. As for the specific construction of the address information detection circuit 59, refer to the description relating to FIGS. 3 and 4 of Japanese Published Patent Application No. 2001-243714 (Patent Document. 2).

In the above-described conventional construction, however, when extracting the wobble amplitude information and the address information, the multipliers of the filters and the signal processing circuits included in the respective detection circuits must be varied for every recording/playback speed. Especially when digital data are recorded at high speed, the detection sensitivity of the wobble amplitude information is lowered by degradation of the detection accuracy due to variations depending on the temperature and the constituents and by burden of the processing of the digital signal processing circuit that operates with reference to a fixed clock, whereby appropriateness of laser power control during recording is undesirably disordered.

Further, a difference in frequencies between the wobble amplitude information as a low frequency component and the address information as a high frequency component is large. Therefore, in order to realize a recording speed range from a low speed to a high speed in the same circuit, the circuit control is complicated and, simultaneously, the circuit scale and the power consumption are increased in accordance with the recording speed.

SUMMARY OF THE INVENTION

The present invention is made to solve the above-mentioned problems and has for its object to provide an optical disc recording/playback apparatus which can improve the detection accuracy and detection sensitivity of wobble amplitude information and address information, and can realize appropriate control of laser power during recording.

Further, it is another object of the present invention to provide an optical recording/playback apparatus which can reduce the circuit scale and power consumption by using a semiconductor integrated circuit to implement the apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disc recording/playback apparatus comprising: a laser oscillation circuit for generating laser light for recording/playback of digital data in/from an optical recording medium in which address information exists intermittently, and wobbles are carved along recording tracks; a first photodetector for detecting reflected light of the laser light from the optical recording medium, as four light signals into which the reflected light is divided along a track direction axis that is a digital data recording direction, and a radius direction axis that is perpendicular to the track direction axis; a light difference signal detection circuit for, among the four outputs from the first photodetector which have been subjected to current-to-voltage conversion, adding the outputs from two areas parallel to the track direction axis, and adding the outputs from the other two areas parallel to the track direction axis, and detecting a difference between the respective addition values to output a light difference signal; a second photodetector for detecting a focus error signal, which detects the reflected light of the laser light from the optical recording medium as a light signal that is divided into two along the radius direction axis that is perpendicular to the track direction axis; a playback signal detection circuit for detecting a playback RF (Radio Frequency) signal by using either the output of the first photodetector which has been subjected to current-to-voltage conversion or the output of the second photodetector which has been subjected to current-to-voltage conversion, or using both of the output of the first photodetector which has been subjected to current-to-voltage conversion and the output of the second photodetector which has been subjected to current-to-voltage conversion; an optical disc controller for transmitting/receiving data and commands to/from an external device, and controlling recording and playback in/from the optical recording medium; a recording gate signal generation circuit for generating a recording gate signal which indicates either a recording state indicating recording of the digital data or a playback state indicating playback of the digital data or the address information, on the basis of a command from the optical disc controller; a light difference signal shaping circuit for output two signals by performing different adjustments to the light difference signal on the basis of the different states indicated by the recording gate signal; a clock generation circuit for generating a sampling clock that is synchronized with a clock component included in the playback signal of the optical recording medium, from one of the output signals of the light difference signal shaping circuit; a first analog-to-digital converter for converting the other output signal of the light difference signal shaping circuit into a digital sampling signal, by the sampling clock; an address information preprocessing circuit for converting the digital sampling signal into an address information preprocessing signal for detecting the address information; a wobble amplitude information preprocessing circuit for converting the digital sampling signal into a wobble amplitude information preprocessing signal for detecting wobble amplitude information as amplitude information of the wobbles; an address information detection circuit for detecting address information from the address information preprocessing signal; a wobble amplitude information detection circuit for detecting wobble amplitude information from the wobble amplitude information preprocessing signal; a recording laser power control circuit for controlling a laser power generated by the laser generation circuit, during recording of digital data, in synchronization with variations in the wobble amplitude information, so that the quality of recorded data is appropriately maintained; and a digital data reproduction circuit for demodulating digital data from the playback RF signal on the basis of the sampling clock to obtain a binarized digital signal, and outputting the binarized digital signal to the optical disc controller.

According to a second aspect of the present invention, in the optical disc recording/playback apparatus according to the first aspect, the light difference signal shaping circuit comprises: a wobble component emphasis circuit for shaping the output signal of the light difference signal detection circuit so as to emphasize the wobble signal component; an amplitude adjustment circuit for adjusting the amplitude of the output signal of the light difference signal detection circuit; and a light difference signal selection circuit for selecting the output signal of the wobble component emphasis circuit when the recording gate signal indicates the recording state, and selecting the output signal of the amplitude adjustment circuit when the recording gate signal indicates the playback state; and the recording laser power control circuit comprises: a digital signal arithmetic processing circuit for generating recording laser power control information for controlling the laser power during recording of digital data; a wobble amplitude information transfer circuit for transferring the wobble amplitude information to the digital signal arithmetic processing circuit; and a recording laser power adjustment circuit for generating a recording laser power control pulse which changes the laser power during recording by the recording laser power control information synchronized with variations in the wobble amplitude information.

According to a third aspect of the present invention, in the optical disc recording/playback apparatus according to the second aspect, the wobble component emphasis circuit comprises: a noise removal circuit for removing noise components other than the frequency components of the wobbles which are formed on the optical recording medium; and a wobble amplitude adjustment circuit for amplifying the amplitude of the output signal of the noise removal circuit to an amplitude suited to an input dynamic range of the first analog-to-digital converter.

According to a fourth aspect of the present invention, in the optical disc recording/playback apparatus according to the second aspect, the light difference signal selection circuit includes an offset difference adjustment circuit for adjusting the offset levels of the output signal of the wobble component emphasis circuit and the output signal of the amplitude adjustment circuit so as to reduce a difference in offset levels in the amplitude direction between the output signal of the wobble component emphasis circuit and the output signal of the amplitude adjustment circuit.

According to a fifth aspect of the present invention, in the optical disc recording/playback apparatus according to the second aspect, the wobble amplitude information transfer circuit comprises: a transfer period flag generation circuit for varying a transfer cycle of the wobble amplitude information according to recording and playback speeds, and generating a transfer cycle flag for every transfer cycle; a wobble amplitude information holding circuit for holding the wobble amplitude information for every transfer cycle flag; and an intake signal generation circuit for generating an intake signal for taking the output signal of the wobble amplitude information holding circuit into the digital signal arithmetic processing circuit for every transfer cycle.

According to a sixth aspect of the present invention, in the optical disc recording/playback apparatus according to the sixth aspect, the wobble amplitude information transfer circuit includes a transfer cycle flag masking circuit for performing a masking process so that the transfer cycle flag generation circuit does not generate a transfer cycle flag when the recording gate signal indicates the playback state.

According to a seventh aspect of the present invention, in the optical disk recording/playback apparatus according to the second aspect, the clock generation circuit comprises: a wobble binarization circuit for converting the output of the wobble component emphasis circuit into binarized data; a frequency sync loop circuit to which the binarized data is input; a voltage controlled oscillator for varying a clock that is outputted according to a signal outputted from the frequency sync loop circuit; and a clock division circuit for arbitrarily dividing the clock outputted from the voltage controlled oscillator into M (M: positive integer) to output the sampling clock; and the frequency sync loop circuit controlling the clock outputted from the voltage controlled oscillator so that the clock is synchronized with a frequency corresponding to the channel bit of the digital data recorded on the optical recording medium or an arbitrary frequency that is N (N: positive integer) times as high as the frequency, on the basis of the frequency of the output signal of the wobble binarization circuit.

According to an eight aspect of the present invention, in the optical disc recording/playback apparatus according to the seventh aspect, the digital data reproduction circuit comprises: a playback signal amplitude adjustment circuit for adjusting the amplitude of the playback RF signal; an equalizer for emphasizing a high frequency component of the output signal of the playback signal amplitude adjustment circuit to improve the jitter; a second analog-to-digital converter for converting the output signal of the equalizer into a digital RF signal by the sampling clock generated by the clock generation circuit; an offset canceller for reducing an offset component in the amplitude direction from the digital RF signal; and a data demodulation circuit for demodulating the binarized digital signal by slicing the binarized digital signal from the output signal of the offset canceller by an arbitrary threshold value.

According to a ninth aspect of the present invention, in the optical disc recording/playback apparatus according to the eighth aspect, the clock generation circuit includes a phase sync control circuit for extracting phase error information from the output signal of the offset canceller, and synchronizing the phase of the sampling clock with the phase of the clock component possessed by the digital data recording on the optical recording medium.

According to a tenth aspect of the present invention, in the optical disc recording/playback apparatus according to the seventh aspect, the wobble amplitude information detection circuit comprises: a peak detection circuit for detecting a peak envelope signal from the wobble amplitude information preprocessing signal; a bottom detection circuit for detecting a bottom envelope signal from the wobble amplitude information preprocessing circuit; a detection cycle generation circuit for determining detection cycles of the peak detection circuit and the bottom detection circuit so that the detection cycle for the wobbles becomes relatively long while the detection cycle for the address information becomes relatively short; a first high frequency noise removal circuit for removing a high frequency noise component from the output signal of the peak detection circuit; a second high frequency noise removal circuit for removing a high-frequency noise component from the output signal of the bottom detection circuit; and a wobble amplitude detection circuit for detecting the wobble amplitude information from a difference between the first high frequency noise removal circuit and the second high frequency noise removal circuit.

According to an eleventh aspect of the present invention, in the optical disc recording/playback apparatus according to the tenth aspect, the detection cycle generation circuit comprises: a first cycle setting circuit and a second cycle setting circuit for setting detection cycles of the peak detection circuit and the bottom detection circuit; a cycle set value selection circuit for selecting an output value of the first cycle setting circuit when the recording gate signal indicates the playback state, and selecting an output value of the second cycle setting circuit when the recording gate signal indicates the recording state; and a detection cycle flag generation circuit for performing counting with the sampling clock, and resetting the count every time the count reaches the output value of the cycle set value selection circuit.

According to a twelfth aspect of the present invention, in the optical disc recording/playback apparatus according to the tenth aspect, the clock generation circuit further includes a sampling clock division circuit for dividing the sampling clock into N (N: positive integer) to generate a frequency divided clock; the peak detection circuit has a function of holding and outputting, with the frequency divided clock, the peak detection result obtained by detecting a peak envelope by the sampling clock on the basis of the wobble amplitude information preprocessing signal; the bottom detection circuit has a function of holding and outputting, with the frequency divided clock, the bottom detection result obtained by detecting a bottom envelope by the sampling clock on the basis of the wobble amplitude information preprocessing signal; and the first high frequency noise removal circuit, the second high frequency noise removal circuit, the wobble amplitude detection circuit, and the wobble amplitude information transfer circuit are operated on the basis of the frequency divided clock.

According to a thirteenth aspect of the present invention, in the optical disc recording/playback apparatus according to the ninth aspect, the wobble amplitude information detection circuit comprises: a peak detection circuit for detecting a peak envelope signal from the wobble amplitude information preprocessing signal; a bottom detection circuit for detecting a bottom envelope signal from the wobble amplitude information preprocessing circuit; a detection cycle generation circuit for determining detection cycles of the peak detection circuit and the bottom detection circuit, so that the detection cycle for the wobbles becomes relatively long while the detection cycle for the address information becomes relatively short; a first high frequency noise removal circuit for removing a high frequency noise component from the output signal of the peak detection circuit; a second high frequency noise removal circuit for removing a high-frequency noise component from the output signal of the bottom detection circuit; and a wobble amplitude detection circuit for detecting the wobble amplitude information from a difference between the first high frequency noise removal circuit and the second high frequency noise removal circuit.

According to a fourteenth aspect of the present invention, in the optical disc recording/playback apparatus according to the thirteenth aspect, the detection cycle generation circuit comprises: a first cycle setting circuit and a second cycle setting circuit for setting detection cycles of the peak detection circuit and the bottom detection circuit; a cycle set value selection circuit for selecting an output value of the first cycle setting circuit when the recording gate signal indicates the playback state, and selecting an output value of the second cycle setting circuit when the recording gate signal indicates the recording state; and a detection cycle flag generation circuit for performing counting with the sampling clock, and resetting the count every time the count reaches the output value of the cycle set value selection circuit.

According to a fifteenth aspect of the present invention, in the optical disc recording/playback apparatus according to the thirteenth aspect, the clock generation circuit further includes a sampling clock division circuit for dividing the sampling clock into N (N: positive integer) to generate a frequency divided clock; the peak detection circuit has a function of holding and outputting, with the frequency divided clock, the peak detection result obtained by detecting a peak envelope by the sampling clock on the basis of the wobble amplitude information preprocessing signal; the bottom detection circuit has a function of holding and outputting, with the frequency divided clock, the bottom detection result obtained by detecting a bottom envelope by the sampling clock on the basis of the wobble amplitude information preprocessing signal; and the first high frequency noise removal circuit, the second high frequency noise removal circuit, the wobble amplitude detection circuit, and the wobble amplitude information transfer circuit are operated on the basis of the frequency divided clock.

According to a sixteenth aspect of the present invention, in the optical disc recording/playback apparatus according to the first aspect, the address information preprocessing circuit comprises: a first signal amplitude attenuation circuit for attenuating the signal amplitude of the digital sampling signal with an arbitrary attenuation rate; and an address information state selection circuit for selecting the digital sampling signal when the recording gate signal indicates the playback state, and selecting the output signal of the first signal amplitude attenuation circuit when the recording gate signal indicates the recording state.

According to a seventeenth aspect of the present invention, in the optical disc recording/playback apparatus according to the first aspect, the wobble amplitude information preprocessing circuit comprises: a second signal amplitude attenuation circuit for attenuating the signal amplitude of the digital sampling signal with an arbitrary attenuation rate; and a wobble amplitude information state selection circuit for selecting the digital sampling signal when the recording gate signal indicates the recording state, and selecting the output signal of the second signal amplitude attenuation circuit when the recording gate signal indicates the playback state.

According to an eighteenth aspect of the present invention, the optical disc recording/playback apparatus according to the first aspect further includes a function of, when a defect due to flaws or stains exists on the digital data recording surface of the optical recording medium, specifying an area of the defect on the basis of the wobble amplitude information, halting the recording operation on the area, and resuming recording from impaired data, into an area after the defect, which area seems to be safe.

According to a nineteenth aspect of the present invention, in the optical disc recording/playback apparatus according to the first aspect, on the optical recording medium, address information exists in the wobbles which are carved along the recording tracks.

According to a twentieth aspect of the present invention, in the optical disc recording/playback apparatus according to the third aspect, on the optical recording medium, address information exists in the wobbles which are carved along the recording tracks; and the noise removal circuit further has a function of removing an LPP (Land PrePit) signal component other than a wobble frequency component.

According to a twenty-first aspect of the present invention, the optical disc recording/playback apparatus according to the first aspect further includes: a high frequency removal filter for removing a high frequency component from the output signal of the light difference signal detection circuit, and outputting the signal as a tracking error signal; and an optical pickup drive circuit for driving an optical pickup comprising the laser generation circuit, the first photodetector, and the second photodetector, on the basis of a command from the optical disc controller.

According to the optical disc recording/playback apparatus of the present invention, when detecting wobble information and address information from an optical recording medium in which the address information exists intermittently and wobbles are carved along recording tracks, a push-pull signal is subjected to processing suited for detection of the wobble amplitude information and the address information, and thereafter, the push-pull signal is converted into a digital signal in a high frequency area by a clock synchronized with the recording speed. Therefore, the wobble amplitude information and the address information can be stably detected with accuracy over a range from a low frequency component to a high frequency component, and laser power control can be optimized against variations in the shape of the optical recording medium or flaws and stains on the recording surface even during high-speed recording, thereby providing an optical disc recording/playback apparatus having high-quality recording performance. Further, it becomes unnecessary to change the multiplier of the digital signal processing circuit according to the recording/playback speed, and the circuit is operated using a clock of a division ratio that is suited to a frequency band required for the processing. Therefore, when the optical disc recording/playback apparatus is implemented by a semiconductor integrated circuit, the circuit scale, cost, and power consumption of the apparatus can be reduced.

Furthermore, according to the optical disc recording/playback apparatus of the present invention, when the laser power during recording is controlled to an appropriate value by the digital signal arithmetic processing circuit that is operated with a fixed clock, considering various factors including temperature, performance of the optical pickup, and circuit variation, and the like, the wobble amplitude information transfer circuit is provided to prevent asynchronous crossing-over of the wobble amplitude information between the sampling clock for generating the wobble amplitude information and the fixed clock, whereby the wobble amplitude information can be transferred without mistake. Further, even during high-speed recording, the wobble amplitude information can be speedily transferred to the digital signal arithmetic processing circuit by shortening the transfer cycle, whereby the laser power during high-speed recording can be appropriately controlled. Moreover, even when there is a CAPA area where no wobbles exist, the wobble amplitude information to be transferred to the digital signal arithmetic processing circuit is riot updated in that area, the accuracy of the wobble amplitude information can be improved, that is, the recording performance can be improved also in a medium where CAPA exists.

Furthermore, according to the optical disc recording/playback apparatus according to the present invention, it is possible to perform exact judgment and accurate control of skip recording in which, when a defect due to flaws and stains exists over a large area on the recording surface, recording is halted, and digital recording is resumed from a safe area which follows the defect area and has not been affected by the defect. When this skip recording is accurately functioned, the quality of the recorded digital data is ensured, and the function of managing the recording quality is dispensed with, and thereby further reduction in the recording time can be achieved.

Moreover, according to the optical disc recording/playback apparatus of the present invention, when detecting a wobble signal component from an optical disc medium on which LPP exist, a greater part of high-frequency projections that occur when detecting the LPP can be attenuated, whereby only the wobble signal component can be easily extracted from the push-pull signal. Thereby, even when recording digital data on a DVD-R disk or a DVD-RW disk, the quality of the recorded digital data can be ensured by optimizing the recording laser power. The application range of the present invention is not restricted to a DVD-R and a DVD-RW, and the present invention is applicable to every optical disc medium on which wobbles are carved along recording tracks, such as a Blu-ray disk.

BRIEF DESCRIPTION OF THE DRAWINGS

FIG. 12 is a diagram for explaining a format of CAPA in a DVD-RAM disk.

DETAILED DESCRIPTION OF THE PREFERRED EMBODIMENT

Hereinafter, a preferred embodiment of an optical disc recording/playback apparatus according to the present invention will be described in detail with reference to the drawings.

Embodiment 1

According to a first embodiment of the present invention, when performing recording on a DVD-RAM as a recordable optical disc, even if there are flaws or stains on a recording surface of the optical disc medium or the optical disc medium itself is distorted in shape, in order to favorably maintain the quality of digital data to be recorded, a signal in which a wobble signal component included in a push-pull signal as a light difference signal detected from the optical disc medium is emphasized is converted into a multiple-bit digital signal with a sampling clock that is generated by frequency synchronization using frequency information extracted from wobbles that are carved along tracks of the optical disc medium, wobble amplitude information indicating the amplitudes of the wobbles is extracted by effectively using a digital filter and a digital signal processing circuit: which are operated on the basis of the sampling clock, a laser power during recording is controlled to an appropriate value using the wobble amplitude information, and address polarity information indicating the relationship between front CAPA and rear CAPA and address position information indicating CAPA areas are accurately detected to stabilize playback of address information, thereby realizing improvement in recording/playback performance of the DVD-RAM.

Figure 1:
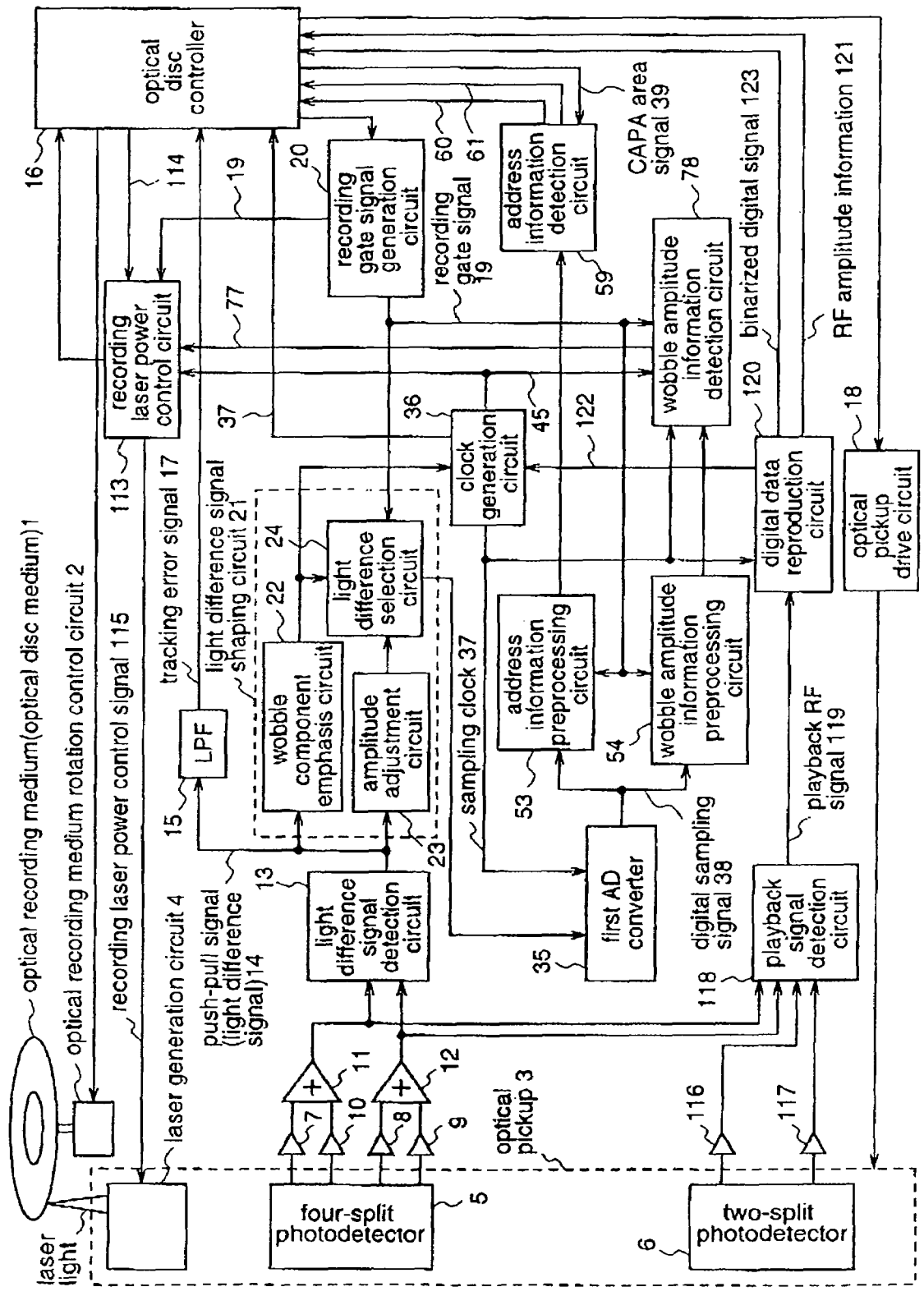
FIG. 1 is a block diagram illustrating the construction of an optical disc recording/playback apparatus according to a first embodiment of the present invention.

FIG. 1 is a block diagram illustrating the construction of an optical disc recording/playback apparatus according to a first embodiment of the present invention.

In FIG. 1, an optical disc medium 1 as an optical recording medium is an information recoding medium having a thin film of a phase change recording material in which digital data are to be recorded, and tracks are spirally or concentrically formed at regular intervals. The first embodiment employs a rewritable DVD-RAM disk as an example of the optical disk medium 1. On the DVD-RAM disk, wobbles, i.e., swells at regular intervals, are carved along the tracks, and address information (CAPA) is intermittently formed in an embossed area. Therefore, a system of high random access performance can be constituted, and the quality of recorded data can be easily ensured using amplitude information and cycle information extracted from the wobbles.

An optical recording medium rotation control circuit 2 rotates the optical disc medium 1 at a predetermined linear velocity, and it is implemented by, for example, a spindle motor, a stepping motor, and the like.

Figure 2:
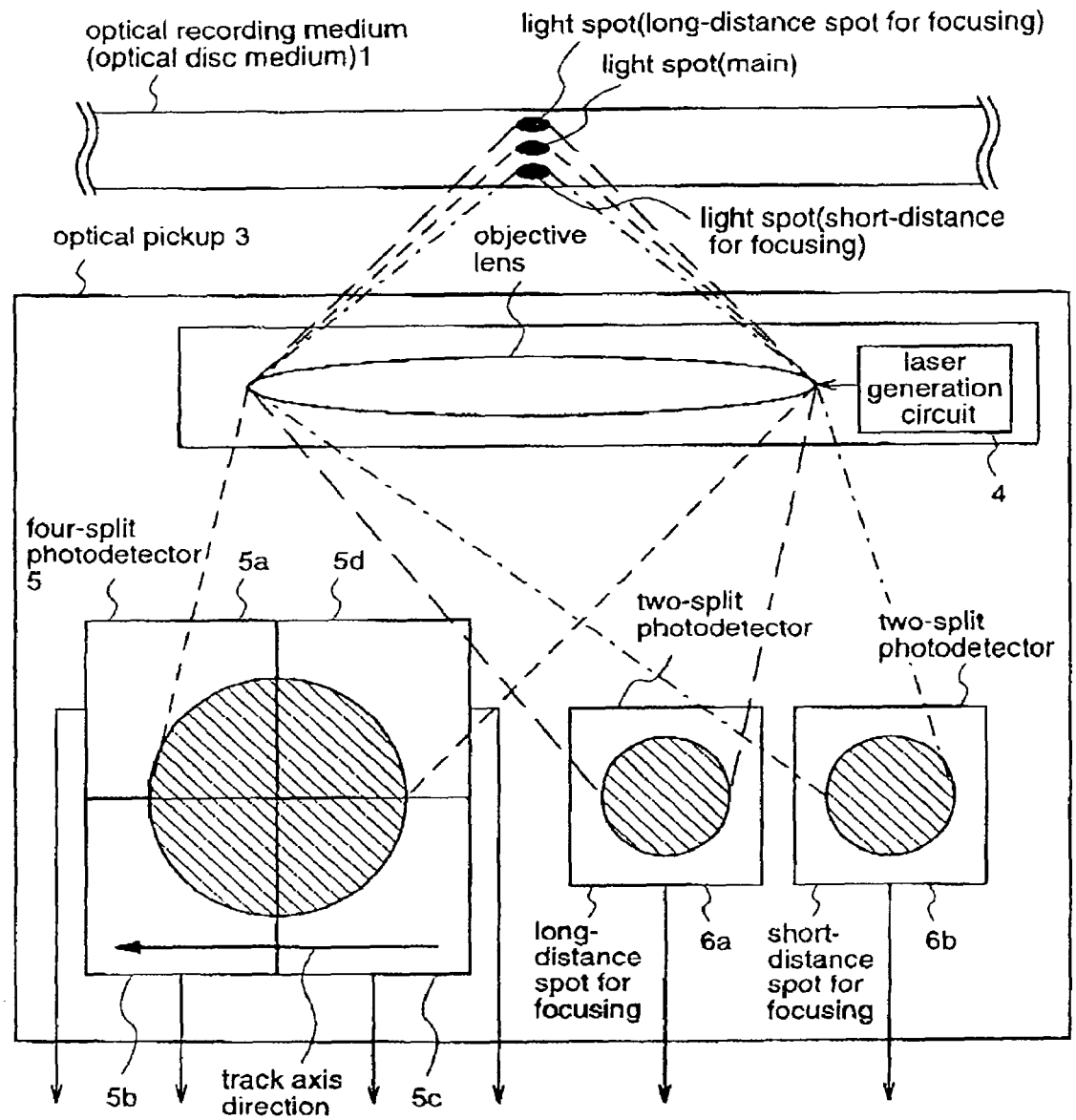
FIG. 2 is a block diagram illustrating the construction of an optical pickup included in the optical disc recording/playback apparatus according to the first embodiment.

An optical pickup 3 performs writing of digital data into the optical disc medium 1, and reading of digital data from the optical disc medium 1. The optical pickup 3 comprises an actuator (not shown) on which a laser generation circuit 4 for focusing a light spot and scanning the tracks is mounted; a four-split photodetector 5 for detecting a tracking error signal and a push-pull signal, which detects reflected light from the light spot and converts it into an electric signal; and a two-split photodetector 6 for detecting a focus error signal, which detects the reflected light from the light spot and converts it into an electric signal. The constructions of the four-split photodetector 5 and the two-split photodetector 6 are shown in FIG. 2. As shown in FIG. 2, the four-split photodetector 5 is divided into four regions 5a to 5d by a track direction axis and an axis perpendicular to the track direction axis. The two-split photodetector is divided into two regions 6a and 6b by the axis perpendicular to the track direction axis.

I/V converters 7 to 10 are current-to-voltage converters for converting the detected currents outputted from the four regions 5a to 5d of the four-split photodetector 5 into voltages. An adder 11 adds the output voltage from the I/V converter 7 and the output voltage from the I/V converter 10 to add the components outputted from the regions 5a and 5d of the four-split photodetector 5, which are parallel to the track direction. An adder 12 adds the output voltage from the I/V converter 8 and the output voltage from the I/V converter 9 to add the components outputted from the regions 5b and 5c of the four-split photodetector 5, which are parallel to the track direction.

A light difference signal detection circuit 13 receives the output signal from the adder 11 and the output signal from the adder 12, and adjusts the amplitude balances of the output signals from the adders 11 and 12, respectively, and then subtracts the output of the adder 12 from the output of adder 11 to generate a light difference signal as a push-pull signal 14.

A LPF 15 detects only a low frequency component of the push-pull signal 14 including a high frequency-component so that the push-pull signal can be treated in a servo band, and inputs the filtered signal to an optical disc controller 16 as a tracking error signal 17.

A recording gate signal generation circuit 20 generates a recording gate signal 19 which indicates the recording state when it is "H" and the playback state when it is "L", on the basis of digital data recording/playback switching information outputted from the optical disc controller 16.

A light difference signal shaping circuit 21 subjects the push-pull signal 14 to different adjustments according to the states or recording and playback.

A clock generation circuit 36 generates a sampling clock 37 for converting an analog signal that is synchronized with a frequency corresponding to a channel bit or the digital data recorded on the optical recording medium 1 into a digital signal, from the push-pull signal in which the amplitude of the wobble signal is emphasized by the light difference signal shaping circuit 21.

A first analog-to-digital (AD) converter 35 converts the push-pull signal which is an analog signal and is subjected to the different adjustments, into a digital sampling signal 38 as a multiple-bit digital signal, at a timing of the sampling clock 37.

An address information preprocessing circuit 53 attenuates the wobble signal component that may cause degradation in the detection accuracy of the address information when recording digital data, and shapes the digital sampling signal 38 into a signal suited for detection of the address information.

A wobble amplitude information preprocessing circuit 54 shapes the digital sampling signal 38 into a signal suited for detection or wobble amplitude information 77.

An address information detection circuit 59 detects address polarity information 60 and address position information 61 on the basis of the output signal from the address information preprocessing circuit 53.

A wobble amplitude information detection circuit 78 detects wobble amplitude information 77 on the basis of the output signal of the wobble amplitude information preprocessing circuit 54.

A recording laser power control circuit 113 generates a recording laser power control signal 115 for controlling the laser power used when recording digital data, in synchronization with variations in the wobble amplitude information 77.

A playback signal detection circuit 118 adds the full output signal component of the four-split photodetector 5 and the full output signal component of the two-split photodetector 6 for focus error detection to generate a playback RF signal 119.

A digital data reproduction circuit 120 outputs RF amplitude information 121 for focus servo on the basis of the playback RF signal 119, and converts the playback RF signal 119 whose amplitude has been adjusted by improving the jitter with a high-order filter, into a multiple-bit digital sampling signal by an AD converter, on the basis of the sampling clock 37, thereby outputting an offset correction signal 122 in which a fluctuation component of an offset in the amplitude direction is reduced, and furthermore, outputting a binarized digital signal 123 at an arbitrary slicer level from the signal in which the fluctuation component of the offset in the amplitude direction is reduced.

An optical pickup drive circuit 18 drives the optical pickup 3 according to a control signal supplied from an optical disc controller 16 (described later) to make the optical pickup 3 perform focus servo and tracking servo.

The optical disc controller 16 performs generation of various control signals required for the optical disc recording/playback apparatus such as a focus servo for focusing the laser beam outputted from the laser generation circuit 4, a tracking servo, seek operation for random access, and rotation control for the optical disc medium 1 using the optical recording medium rotation control circuit 2, as well as processings such as encoding and decoding of the recorded digital data, through the optical pickup drive circuit 18, on the basis of the tracking error signal 17, the binarized digital signal 123 demodulated from the playback RF signal 119, the amplitude information of the playback RF signal 119 for focus control, the address polarity information 60 and the address position information 61 extracted from the CAPA area.

Next, the operation of the optical disc recording/playback apparatus according to the first embodiment will be described. When recording digital data on the DVD-RAM disk, recording into the data area and reproduction of the address information from the CAPA area are alternately repeated. Hereinafter, recording of the digital data and reproduction of the address information, which are alternately repeated, and ordinary reproduction will be described. The operation described hereinafter is merely an example, and the present invention is not restricted thereto.

A laser beam emitted from the laser generation circuit 4 of the optical pickup 3 is reflected at the optical disc medium 1, and the reflected light is received by the four regions 5a to 5d of the four-split photodetector 5. The four-split photodetector 5 outputs detected currents according to the amounts of light received by the respective areas 5a to 5d, and the detected currents are converted into voltage values by the I/V converters 7 to 10. The output voltages of the I/V converters 7 and 10 are added by the adder 11 and the output voltages of the I/V converters 8 and 9 are added by the adder 12, and thereafter, outputted to the light difference signal detection circuit 13.

The light difference signal detection circuit 13 adjusts the amplitude balances of the output signals of the address 11 and 12, and subtracts the output signal of the adder 12 from the output signal of the adder 11 to generate a push-pull signal (light difference signal) 14, and inputs the push-pull signal 14 to the LPF 15 and the light difference signal shaping circuit 21.

The LPF 15 detects only a low-frequency component from the push-pull signal 14 including a high-frequency component so that the push-pull signal 14 can be treated in a servo band, and inputs the filtered signal as a tracking error signal 17 to the optical disc controller 16.

Further, the push-pull signal inputted to the light difference signal shaping circuit 21 is subjected to different adjustments depending on the state of recording or reproduction.

Hereinafter, the operation principle, detailed circuit structure, and operation of the light difference signal shaping circuit 21 will be described with reference to FIGS. 3 to 7 and 23. The circuit structure and operation principle described hereinafter are merely examples, and the present invention is not restricted thereto.

Figure 3:
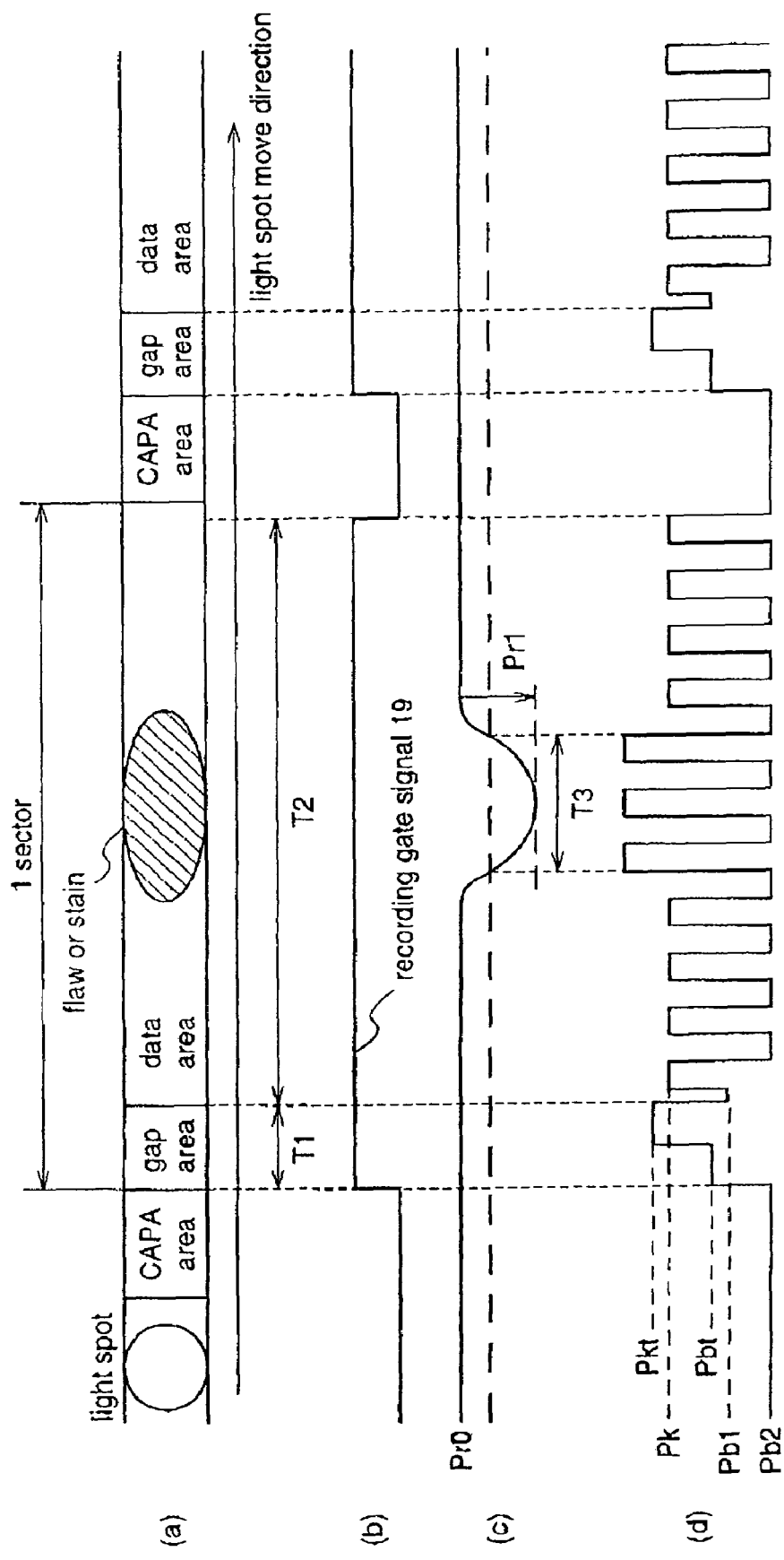
FIG. 3 is a diagram for explaining the principle of recording laser power control of the optical disc recording/playback apparatus according to the first embodiment.

The push-pull signal 14 includes a wobble signal indicating wobbles, and wobble amplitude information 77 as amplitude information of the wobble signal can be a guidance indicating the recording state that varies depending on the presence of defect due to such as flaws or stains on the recording surface as shown by a shaped elliptical area in FIG. 3(*a*), the shape of the optical disc medium 1, the characteristics of the optical pickup 3, the environment of the optical disc recording/playback apparatus.

Figure 5:
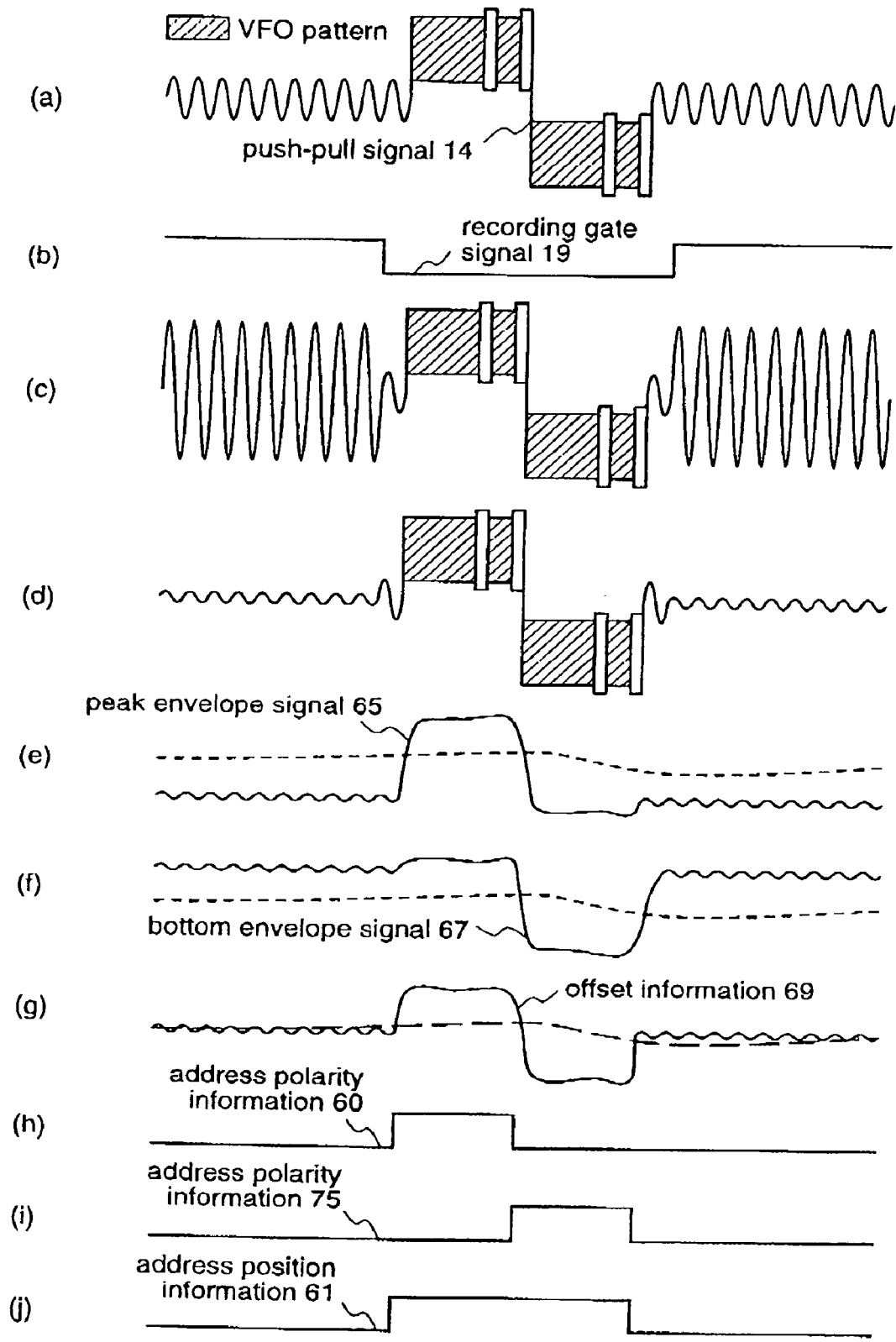
FIG. 5 is a diagram for explaining the principle of generating address polarity information and address position information during recording according to the first embodiment.
Figure 23:
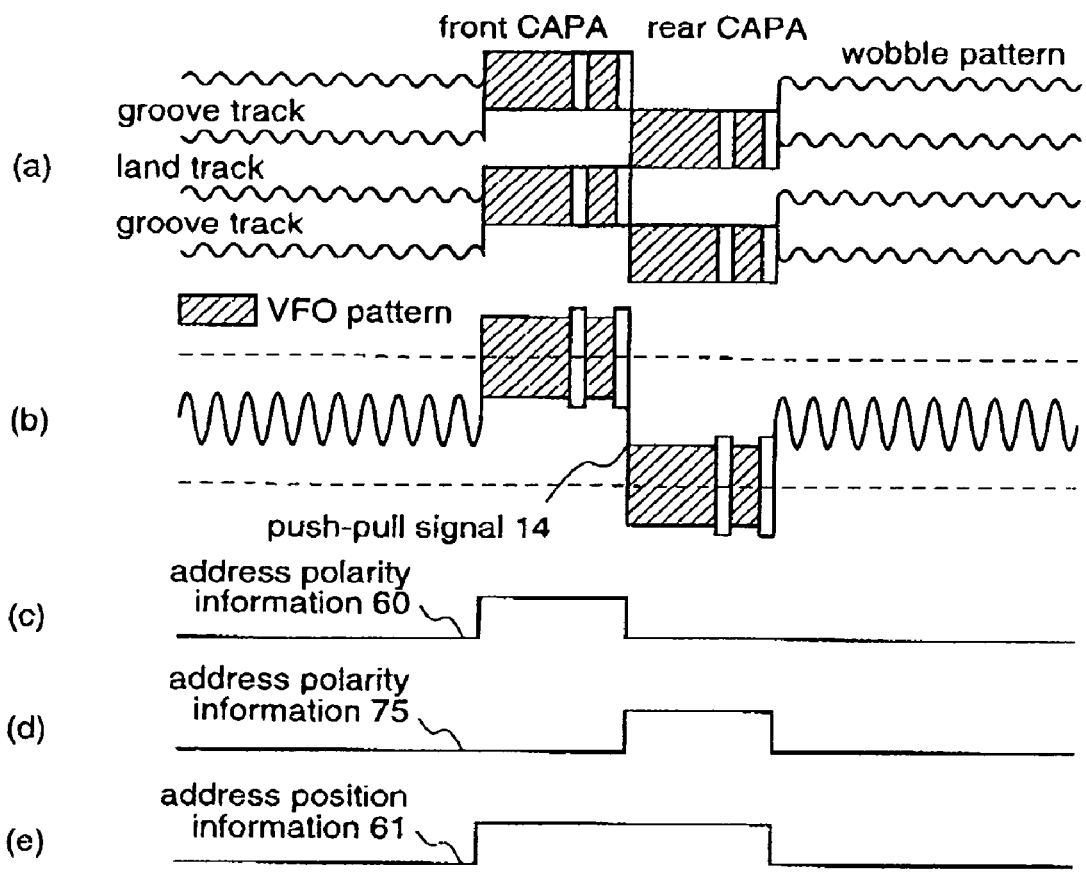
FIG. 23 is a diagram for explaining the principle of generating address polarity information and address position information in the conventional DVD-RAM disk recording/playback apparatus.
Figure 24:
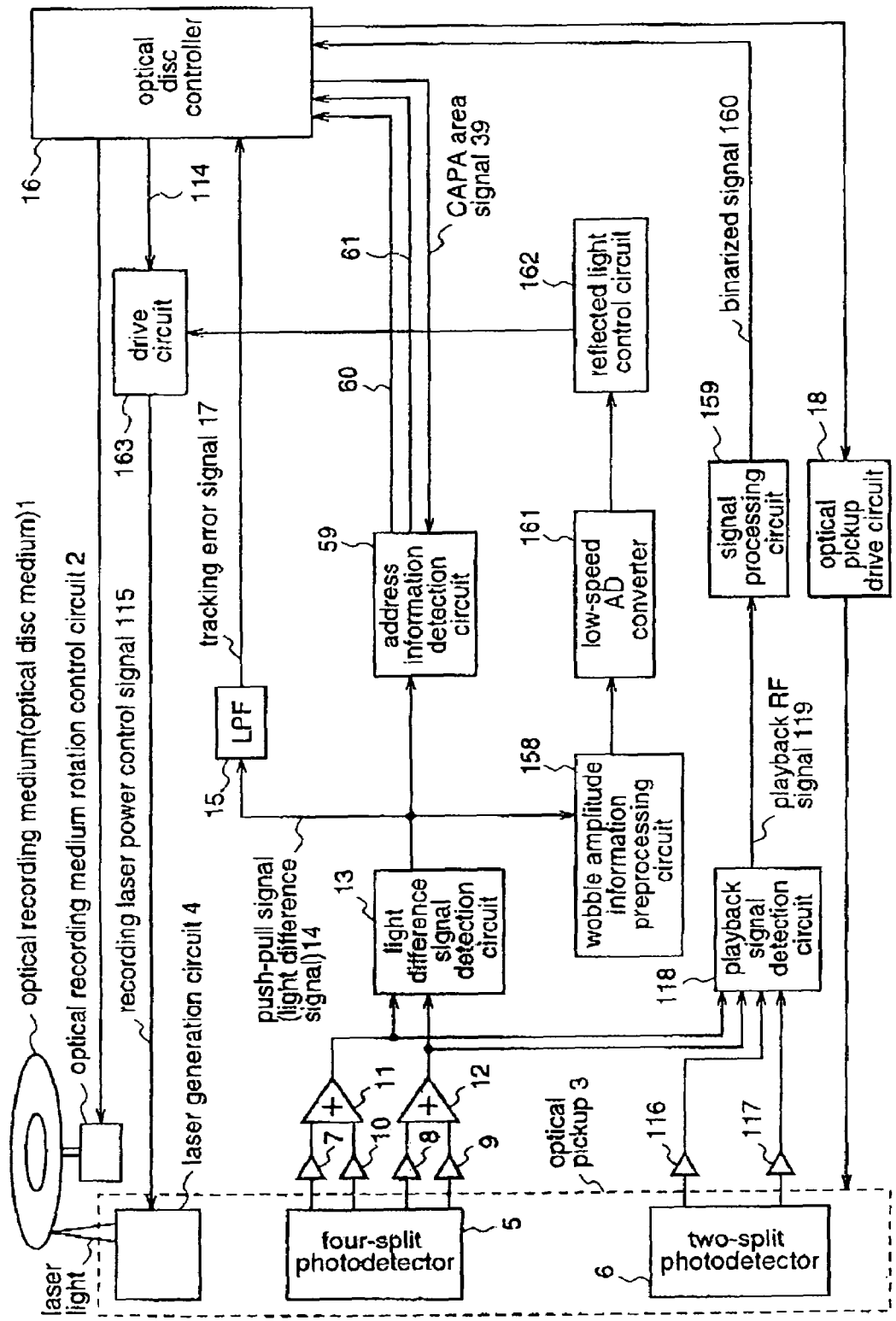
FIG. 24 is a block diagram illustrating the construction of the conventional DVD-RAM disc recording/playback apparatus.

Further, as shown in FIG. 23(*a*), on the DVD-RAM disk, a digital data recording area is constructed with groove tracks and land tracks being alternately arranged. As for the CAPA area, the front CAPA and the rear CAPA are positionally inverted so as to correspond to the groove track and the land track, respectively, whereby the front CAPA and the rear CAPA appear antithetically up and down in the push-pull signal 14, as shown in FIGS. 5(*a*), 6(*a*), and 7(*a*). The Wobbles which are carved along the tracks as shown in FIG. 23(*a*) appear as wobble signal components in an area other than the CAPA area, as shown in FIGS. 5(*a*), 6(*a*), and 7(*a*). At this time, no wobble signal components exist in the CAPA area. It becomes possible to determine whether the light spot scans the land track or the groove track, on the basis of the polarity information of the front CAPA and the rear CAPA, and further, it becomes possible to specify the demodulated address information.

Therefore, it is possible to obtain highly precise wobble amplitude information and address information by determining whether the push-pull signal 14 is generated in the CAPA area or the area other than the CAPA area, and performing adjustment according to the area.

Figure 4:
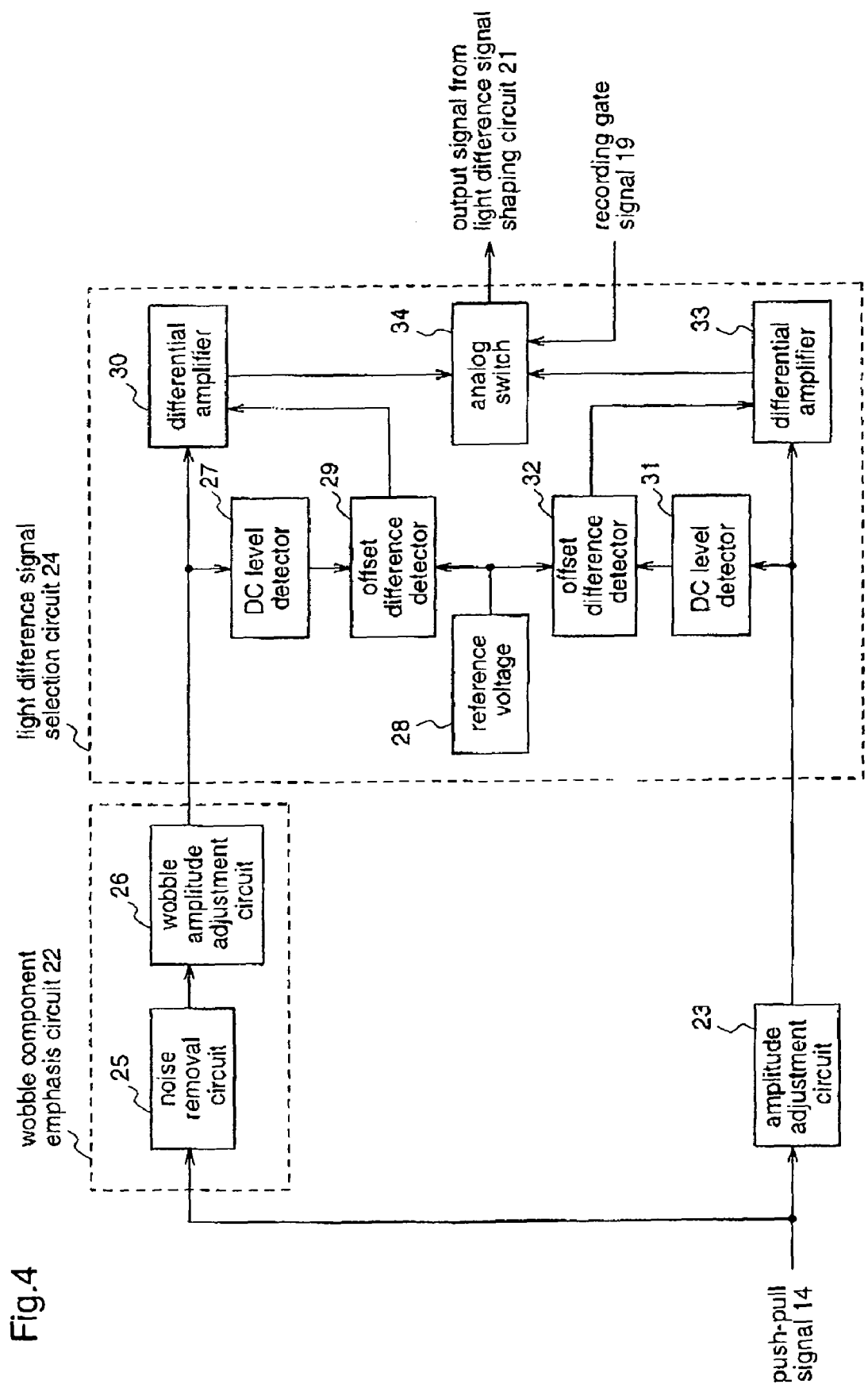
FIG. 4 is a block diagram illustrating the construction of a light difference signal shaping circuit included in the optical disc recording/playback apparatus according to the first embodiment.

FIG. 4 is a block diagram illustrating the construction of the light difference signal shaping circuit 21.

As shown in FIG. 4, the light difference signal shaping circuit 21 comprises a light signal shaping circuit 21, a wobble component emphasis circuit 22, an amplitude adjustment circuit 23, and a light difference signal selection circuit 24.

The wobble component emphasis circuit 22 removes frequency components other than the wobble signal component, included in the light difference signal 14, to improve the wobble signal, whereby the push-pull signal 14 is shaped to emphasize the amplitude of the wobble signal component. The wobble component emphasis circuit 22 comprises a VGA (Voltage Gain Amplitude) or the like that arbitrarily varies the gain.

The amplitude adjustment circuit 23 shapes the CAPA signal as a signal component in the CAPA area that exists in the push-pull signal 14 into an amplitude suited to the dynamic range in the amplitude direction of the first AD converter 35 to be described later. The amplitude adjustment circuit 23 comprises a VGA or the like that arbitrarily varies the gain.

The light difference signal selection circuit 24 selects and outputs the output signal of the wobble component emphasis circuit 22 when the recording gate signal 19 indicates "H" that is the recording state, and selects and outputs the output signal of the amplitude adjustment circuit 23 when the recording gate signal 19 indicates "L" that is the playback state.

Next, the operation of the light difference signal shaping circuit 21 will be described.

The push-pull signal 14 generated in the light difference signal detection circuit 13 is, as shown in FIG. 4, input to the wobble component emphasis circuit 22 and the amplitude adjustment circuit 23. The wobble component emphasis circuit 22 comprises a noise removal circuit 25 and a wobble amplitude adjustment circuit 26, and the push-pull signal 14 inputted to the noise removal circuit 25 is subjected to removal of noise components other than the wobble signal frequency component. The noise removal circuit 25 is composed of a band-pass filter (hereinafter referred to as a BPF). Since the BPF can remove the RF signal component that is detected from the digital data recorded on the optical disc medium 1 and appears as a crosstalk noise, the jitter of the wobble signal can be improved. Thereby, precision of the wobble amplitude information 77 to be described later and precision of the frequency sync control of the sampling clock 37 generated by the clock generation circuit 36 are improved, leading to improvements in appropriateness of the laser power control during recording and in the detection accuracy of the address information. The output signal of the noise removal circuit 25 is input to the wobble amplitude adjustment circuit 26 comprising such as a VGA that arbitrarily varies the gain, and shaped into an amplitude suited to the dynamic range in the amplitude direction of the first AD converter 35 to be described later, and thereafter, input to the light difference signal selection circuit 24.

On the other hand, the amplitude adjustment circuit 23 shapes the CAPA signal as a signal component of the CAPA area that exists in the push-pull signal 14 into an amplitude suited to the dynamic range in the amplitude direction of the first AD converter 35 to be described later, and outputs the shaped CAPA signal to the light; difference signal selection circuit 24.

When the light spot that is formed in the focus position of the laser beam emitted from the laser generation circuit 4 scans along the tracks on the DVD-RAM disk, the recording gate signal generation circuit 20 generates a recording gate signal 19 according to the respective areas on the tracks. To be specific, a recording gate signal 19 which indicates the playback state "L" in the CAPA area for reproducing the address information and during playback, and indicates the recording state "H" in the data area and the gap area during recording as shown in FIG. 3(b) is generated by the recording gate signal generation circuit 20, correspondingly to the CAPA area wherein the address information exists, which exists along the tracks on the DVD-RAM disc, the gap area used for preparation of recording, which is positioned at the boundary between the CAPA area and the data area, and the data area wherein digital data are recorded.

Then, the light difference signal selection circuit 24 selects either the output signal of the wobble amplitude adjustment circuit 26 or the output of the amplitude adjustment circuit 23 on the basis of the recording gate signal 19, and outputs the selected signal. That is, the analog switch 34 receives the recording gate signal 19, and selects the output signal of the wobble amplitude adjustment circuit 26 when the recording gate signal 19 indicates "H" that is the recording state, and selects the output signal of the amplitude adjustment circuit 23 when the recording gate signal 19 indicates "L" that is the playback state.

When selecting the output signal by the light difference signal selection circuit 24, there is a possibility that the output signal of the wobble amplitude adjustment circuit 26 and the output signal of the amplitude adjustment circuit 23 may have different offset components, leading to a possibility that an offset difference may appear in the output signal of the light difference signal selection circuit 24. Therefore, the offset level is detected from the output signal of the wobble amplitude adjustment circuit 26 by the DC level detector 27 constituted by a low-pass filter or the like, and a voltage difference from the reference voltage 28 is detected by the offset difference detector 29 constituted by a differential amplifier or the like, and thereafter, the output signal of the offset difference detector 29 is subtracted from the output signal of the wobble amplitude adjustment circuit 26 by the differential amplifier 30, whereby the offset level of the output signal of the wobble amplitude adjustment circuit 26 is adjusted to the reference voltage 28. On the other hand, the offset level is detected from the output signal of the amplitude adjustment circuit 23 by the DC level detector 31 constitute by a low-pass filter or the like, and a voltage difference from the reference voltage 28 is detected by the offset difference detector 32 constituted by a differential amplifier or the like, and thereafter, the output signal of the offset difference detector 32 is subtracted from the output signal of the amplitude adjustment circuit 23 by the differential amplifier 33, whereby the offset level of the output signal of the amplitude adjustment circuit 23 is adjusted to the reference voltage 28. Then, the analog switch 34 selects the output signal of the differential amplifier 30 when the recording gate signal 19 indicates "H", and selects the output of the differential amplifier 33 when the recording gate signal 19 indicates "L". In this way, the offset difference between the output signal of the wobble component emphasis circuit 22 and the output signal of the amplitude adjustment circuit 23 is reduced, thereby improving stability and detection accuracy of the wobble amplitude information 77 and the address information.

The output signal of the light difference signal shaping circuit 21 which is obtained by the above-mentioned operation becomes a signal as shown in FIG. 5(c) and FIG. 6(c) when recording digital data. That is, in the section where the recording gate signal 19 shown in FIG. 5(b) and FIG. 6(b) is "H", the wobble signal is extracted and the amplitude thereof is emphasized. In the section where the recording gate signal 19 is "L", the CAPA signal required for address reproduction is outputted. On the other hand, in the normal playback state, the output signal of the light difference signal shaping circuit 21 is the output signal of the amplitude adjustment circuit 23 as shown in FIG. 7(c). At this time, as shown in FIG. 7(b), the recording gate signal 19 is constantly "L".

next, the output signal of the light difference signal selection circuit 24 is input to the first AD converter 35. The first AD converter 35 converts the output signal of the light difference signal selection circuit 24, which is an analog signal, into a digital sampling signal 38 as a multiple-bit digital signal, at the timing of the sampling clock 37 that is generated by the clock generation circuit 36.

The clock generation circuit 36 generates a sampling clock 37 synchronized with the channel bit frequency component of the digital data recorded on the optical disc medium 1, on the basis of the cycle information of the wobble signal included in the push-pull signal 14. The cycle of the wobbles on the DVD-RAM disc corresponds to 186 channel bits. That is, $1/186$ of the channel bit frequency is equivalent to the frequency of the wobble signal. The sampling clock 37 generated in the clock generation circuit 36 is input to the optical disc controller 16, and thereafter, is used as a reference signal for the CAPA area signal 39.

Hereinafter, the detailed circuit structure and the operation of the clock generation circuit 36 will be described.

Figure 8:
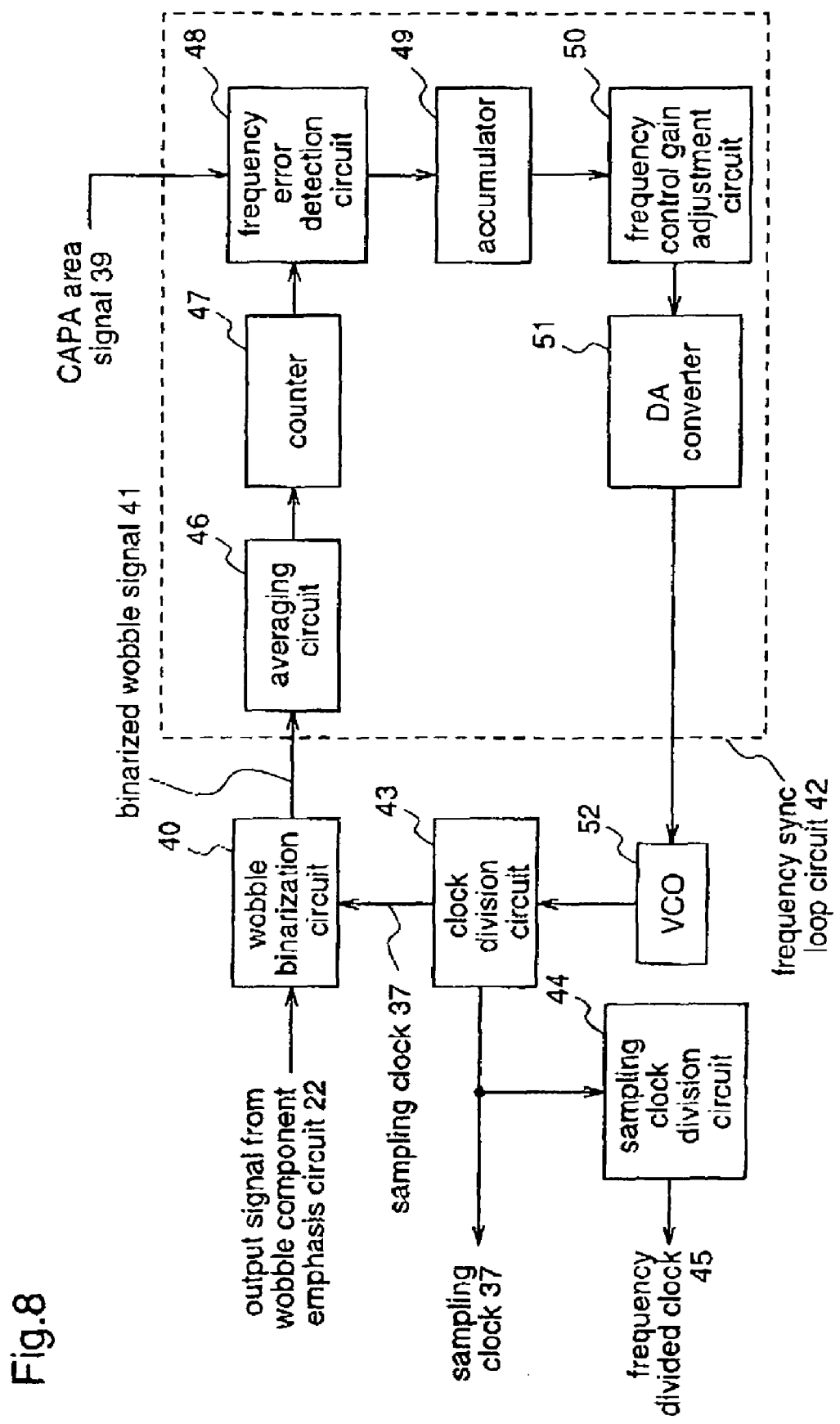
FIG. 8 is a block diagram illustrating the construction of a clock generation circuit according to the first embodiment.

FIG. 8 is a diagram illustrating the detail of the construction of the clock generation circuit 36. The circuit shown in FIG. 8 is merely an example, and the present invention is not restricted thereto.

As shown in FIG. 8, the clock generation circuit 36 includes a wobble binarization circuit 40, a frequency sync loop circuit 42, a voltage controlled oscillator (hereinafter referred to as a VCO) 52, a clock division circuit 43, and a sampling clock division circuit 44.

The wobble binarization circuit 40 converts the output signal of the wobble component emphasis circuit 22 into a binarized wobble signal 41 by an arbitrary threshold level.

The frequency sync loop circuit 42 performs control so that the frequency of the sampling clock 37 generated by the clock generation circuit 36 is synchronized with the frequency corresponding to the channel bit of the digital data recorded on the optical disc medium 1 or a frequency that is N (N: positive integer) times as high as the channel bit frequency. The detailed construction thereof will be described later.

The VCO 52 generates a predetermined oscillation frequency according to a digital frequency control signal that is generated by the frequency sync loop circuit 42, under control of the clock division circuit 43.

The clock division circuit 43 generates a sampling clock 37 by arbitrarily dividing the clock generated by the VCO 52 into M (M: positive integer).

The sampling clock division circuit 44 generates a division clock 45 by arbitrarily dividing the sampling clock 37 into L (L: arbitrary positive integer).

Next, the operation of the clock generation circuit 36 will be described. FIG. 8 shows the construction of the clock generation circuit 36 in the case where the above-mentioned N is 1, and the division ratio M of the clock division circuit 43 is 1. Hereinafter, the operation of the clock generation circuit 36 in the case where N=1 and M=1 will be described.

In FIG. 8, the output signal of the wobble component emphasis circuit 22 is input to the wobble binarization circuit 40, converted into the binarized wobble signal 41 by an arbitrary threshold level, and then input to the frequency sync loop circuit 42. The arbitrary threshold level may correspond to an intermediate level between a peak envelope and a bottom envelope of the output signal of the wobble component emphasis circuit 22.

The frequency sync loop circuit 42 includes an averaging circuit 46, a counter 47, a frequency error detection circuit 48, an accumulator 49, a frequency control gain adjustment circuit 50, and a DA converter 51. The binarized wobble signal 41 outputted from the wobble binarization circuit 40 is converted into a digital signal by the sampling clock 37 in the averaging circuit 46, thereby averaging the glitch noise and the edge interval. The counter 47 counts one cycle from the rising edge of the signal outputted from the averaging circuit 46 to the next rising edge, with reference to the sampling clock 37. The frequency error detection circuit 48 detects a difference between the output value of the counter 47 and the value of the 186 channel bit which is the wobble cycle in the DVD-RAM disk according to the following formula (1), thereby generating a frequency error signal.

(output signal of the frequency error detection circuit 48)=186−(output signal of the counter 47)    (1)

The accumulator 49 accumulates the frequency error signal outputted from the frequency error detection circuit 48, and the frequency control gain adjustment circuit 50 performs gain adjustment to the output of the accumulator 49. The DA converter 51 converts the digital frequency control signal outputted from the frequency control gain adjustment circuit 50 into an analog control signal, and outputs it to the VCO 52.

When the frequency sync loop circuit 42 counts one cycle from a rising edge of the binarized wobble signal 41 to the next rising edge by the sampling clock 37 corresponding to the channel bit frequency, if the count value is smaller than 186, the frequency sync loop circuit 42 generates a positive frequency error signal to increase the frequency of the clock generated by the VCO. When the count value is larger than 186, the frequency sync loop circuit 42 generates a negative frequency error signal to decrease the frequency of the clock generated by the VCO. In this way, the frequency sync loop circuit 42 may perform frequency sync control using the sampling clock 37 with reference to the cycle of the wobble signal component.

The VCO 52 generates an oscillation clock whose cycle is changed according to the output voltage of the DA converter 51. The oscillation clock outputted from the VCO 52 is frequency-divided (M=1) by the clock division circuit 43 and thereafter input to the first AD converter 35 as a sampling clock 37.

Further, the sampling clock 37 is input to the sampling clock division circuit 44, and arbitrarily frequency-divided into L (L: positive integer), thereby generating a division clock 45. The division clock 45 thus generated is used as a reference clock by a detection circuit for the wobble amplitude information 77 to be described later. Further, the above-mentioned L may be set to "1" so that the sampling clock 37 and the division clock 45 are treated by the same clock. By appropriately using the sampling clock 37 and the division clock 45 thus generated according to the operation band of the circuit, redundant circuits are dispensed with particularly when this construction is implemented by a semiconductor integrated circuit, resulting reductions in the circuit scale and power consumption.

Through the above-mentioned sequence of operations, a sampling clock 37 synchronized with the cycle of the wobbles carved in the optical disc medium 1 can be generated. That is, it is possible to generate a digital sampling signal 38 synchronized with the clock component of the wobble included in the push-pull signal 14, by performing feedback control so as to make the frequency error signal as the output signal of the frequency error detection circuit 48 zero, using a main control loop comprising the wobble binarization circuit 40, the frequency sync loop circuit 42, the clock division circuit 43, and the wobble binarization circuit 40.

In this way, since a sampling clock and its division clock, for converting an analog signal synchronized with the frequency corresponding to the channel bit of the digital data recorded on the optical recording medium 1 into a digital signal, can be generated from the cycle of the wobble signal detected from the optical recording medium 1, change in the multiplier of the digital signal processing circuit according to the recording/playback speed is dispensed with. Thereby, when the optical disc recording/playback apparatus of the present invention is implemented by a semiconductor integrated circuit, the construction is simplified and the circuit scale is reduced. The operations of the respective digital circuits described hereinafter are desired to be based on the sampling clock 37, and the arbitrary division clock 45 of the sampling clock 37.

Next, the digital sampling signal 38 outputted from the first AD converter 35 is input to the address information preprocessing circuit 53 and the wobble amplitude information preprocessing circuit 54.

Hereinafter, the detailed structures and operations of the address information preprocessing circuit 53 and the wobble amplitude information preprocessing circuit 54 will be described.

Initially, the circuit structure and operation of the address information preprocessing circuit 53 will be described with reference to FIG. 9. The circuit structure shown in FIG. 9 is merely an example, and the present invention is not restricted thereto.

Figure 9:
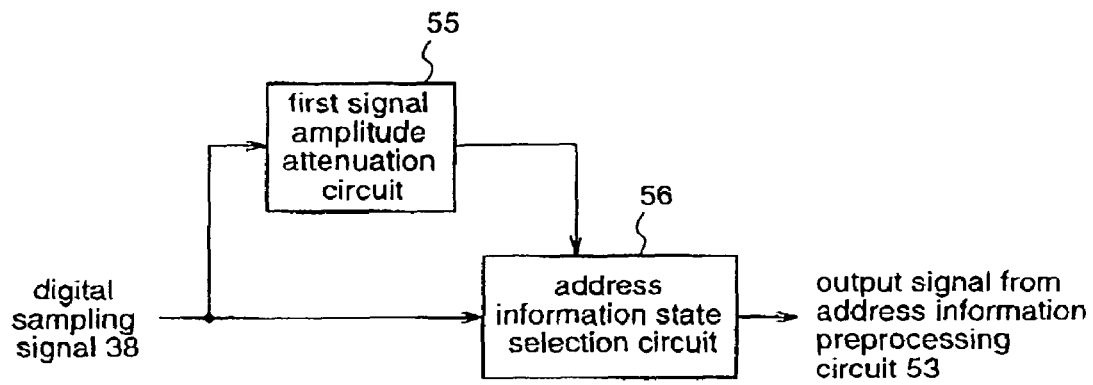
FIG. 9 is a block diagram illustrating the construction of an address information preprocessing circuit according to the first embodiment.

FIG. 9 is a block diagram illustrating the construction of the address information preprocessing circuit 53.

With reference to FIG. 9, the address information preprocessing circuit 53 includes a first signal amplitude attenuation circuit 55 for attenuating the wobble signal component included in the digital sampling signal 38 using a bit shift circuit or the like, and an address information state selection circuit 56 for selecting either the digital sampling signal 38 or the output signal of the first signal amplitude attenuation circuit 55 on the basis of the recording gate signal 19, and outputting the selected signal.

Next, the operation of the address information preprocessing circuit 53 will be described.

The digital sampling signal 38 is input to the address information state selection circuit 56. Simultaneously, the digital sampling signal 38 is input to the first signal amplitude attenuation circuit 55, wherein the wobble signal component thereof is attenuated, and the resultant signal is input to the address information state selection circuit 56. The address information state selection circuit 56 selects the output signal of the first signal amplitude attenuation circuit 55 when the recording gate signal 19 indicates "H" that is the recording state, and selects the digital sampling signal 38 when the recording gate signal 19 indicates "L" that is the playback state. The output signal of the address information preprocessing circuit 53 becomes a signal as shown in FIG. 5(d) during recording, and it becomes a signal as shown in FIG. 7(c) during playback. As shown in FIG. 5(d), in the section where the recording gate signal 19 is "H" indicating the recording state, the wobble signal component is attenuated by the first signal amplitude attenuation circuit 55 to be advantageous for detection of the address information. Since the signal during playback shown in FIG. 7(c) does not originally emphasize the wobble signal component, it is advantageous for detection of the address information. In this way, since the wobble signal component which may cause degradation in the address information detection accuracy can be attenuated during recording of digital data, stable reproduction of the address information can be realized.

Next, the circuit structure of the wobble amplitude information preprocessing circuit 54 will be described with reference to FIG. 10. The circuit structure shown in FIG. 10 is merely an example, and the present invention is not restricted thereto.

Figure 10:
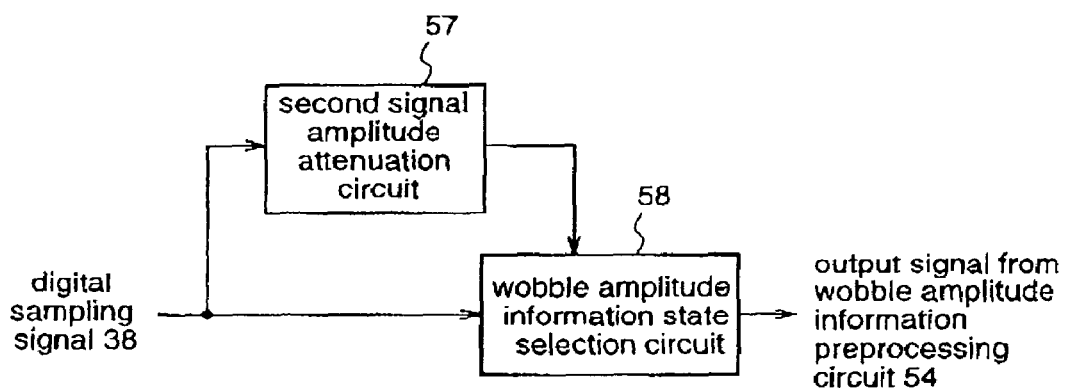
FIG. 10 is a block diagram illustrating the construction of a wobble amplitude information preprocessing circuit according to the first embodiment.

FIG. 10 is a block diagram illustrating the construction of the wobble amplitude information preprocessing circuit 54.

As shown in FIG. 10, the wobble amplitude information preprocessing circuit 54 includes a second signal amplitude attenuation circuit 57 for attenuating the CAPA signal component included in the digital sampling signal 38 using a bit shift circuit or the like, and a wobble amplitude in information state selection circuit 58 for selecting either the digital sampling signal 30 or the output signal of the second signal amplitude attenuation circuit 57 on the basis of the recording gate signal 19, and outputting the selected signal.

Next, the operation of the wobble amplitude information preprocessing circuit 54 will be described.

The digital sampling signal 38 is input to the wobble amplitude information state selection circuit 58. Simultaneously, the digital sampling signal 38 is input to the second signal amplitude attenuation circuit 57, wherein the CAPA signal component thereof is attenuated, and the resultant signal is input to the wobble amplitude information state selection circuit 58. The wobble amplitude information state selection circuit 58 selects the output signal of the second signal amplitude attenuation circuit 57 when the recording gate signal 19 indicates "L" that is the playback state, and selects the digital sampling signal 38 when the recording gate signal 19 indicates "H" that is the recording state. The output signal of the wobble amplitude information preprocessing circuit 54 becomes a signal as shown in FIG. 6(d) during recording. As shown in FIG. 6(d), in the section where the recording gate signal 19 is "L" indicating the playback state, the CAPA signal component is attenuated by the second signal amplitude attenuation circuit 57 to be advantageous for detection of the wobble amplitude information. In this way, since it is possible to attenuate the CAPA signal component during playback of the address information which may cause degradation in the wobble amplitude information during recording, detection of the wobble amplitude information is stabilized to realize appropriate setting of the recording laser power.

Next, the output signal of the address information preprocessing circuit 53 is input to the address information detection circuit 59, and address polarity information and address position information 61 are detected.

Hereinafter, the detailed circuit structure and operation of the address information detection circuit 59 will be described with reference to FIG. 11. The circuit structure shown in FIG. 11 is merely an example, and the present invention is not restricted thereto.

Figure 11:
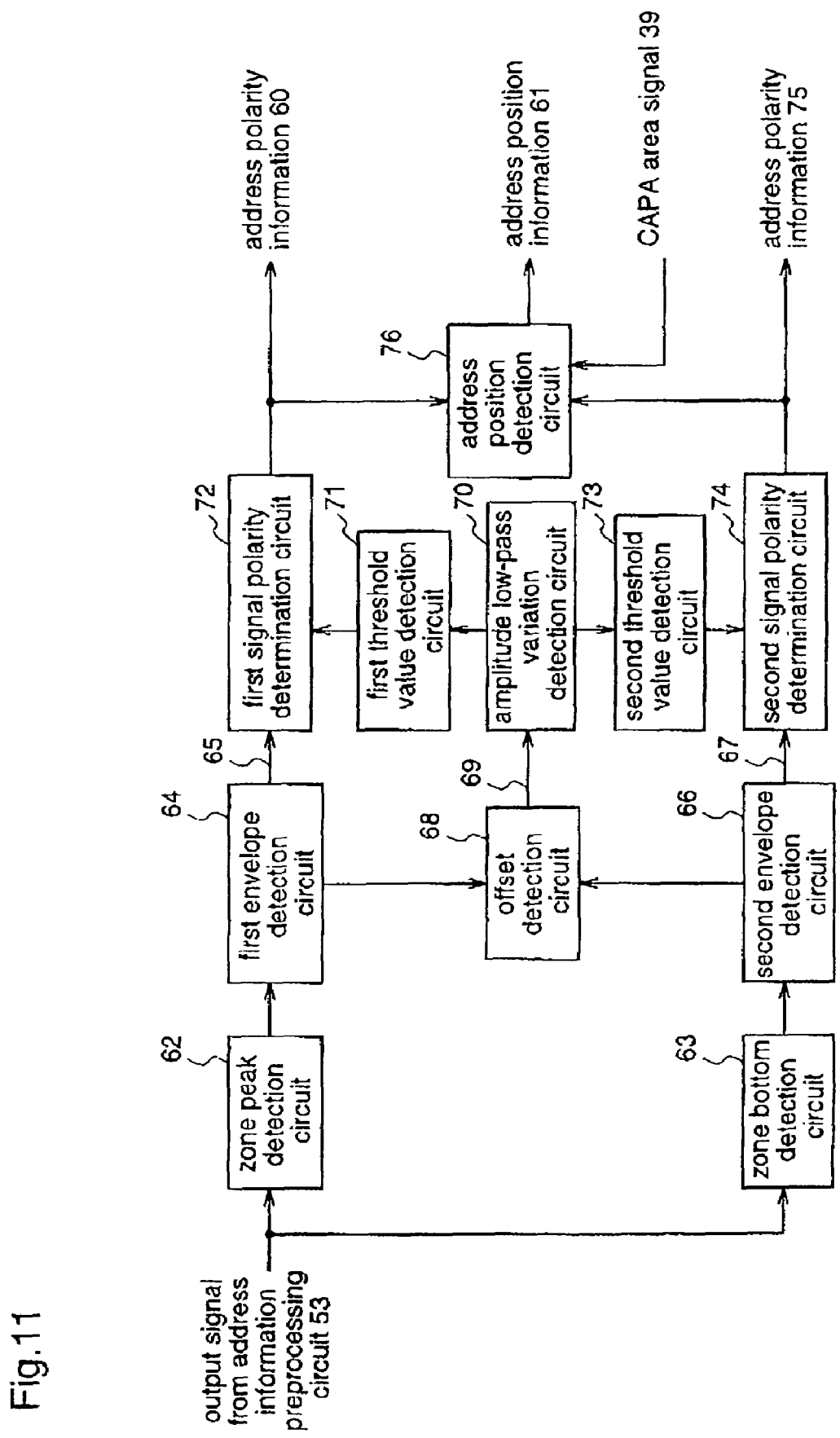
FIG. 11 is a block diagram illustrating the construction of an address information detection circuit according to the first embodiment.

FIG. 11 is a block diagram illustrating the construction of the address information detection circuit 59.

With reference to FIG. 11, a zone peak detection circuit 62 detects a peak level in an arbitrary zone, of the output signal of the address information preprocessing circuit 53. A zone bottom detection circuit 63 detects a bottom level in an arbitrary zone, of the output signal of the address information preprocessing circuit 53.

A first envelope detection circuit 64 and a second envelope detection circuit 66 remove high-frequency noise components in the output signals from the zone peak detection circuit 62 and the zone bottom detection circuit 63, respectively.

An offset detection circuit 68 adds the peak level and the bottom level from which the high-frequency noise components are removed, and thereafter, halves the gain to extract offset information 69.

An amplitude low-pass variation detection circuit 70 detects an amplitude low-pass variation component from the offset information 69.

Each of a first threshold detection circuit 71 and a second threshold detection circuit 73 adds an arbitrary offset level to the inputted amplitude low-pass variation component, and outputs a first or second threshold value.

A first signal polarity determination circuit 72 compares the peak level after removal of the high-frequency noise component with the first threshold value to generate address polarity information 60. A second signal polarity determination circuit 74 compares the bottom level after removal of the high-frequency noise component with the second threshold value to generate address polarity information 75.

An address position detection circuit 76 adds the address polarity information 60 and the address polarity information 75 by an OR circuit or the like to generate address position information 61.

Next, the operation of the address information detection circuit 59 will be described.

The output signal which is outputted from the address information preprocessing circuit 53 on the basis of the sampling clock 37 generated by the clock generation circuit 36 is input to the zone peak detection circuit 62 and the zone bottom detection circuit 63. The zone peak detection circuit 62 compares the peak level which is held for each sampling clock 37 with the input signal to hold a larger value, and detects a peak level in an arbitrary zone. Further, the zone bottom detection circuit 63 compares the bottom level which is held for each sampling clock 37 with an input signal to hold a smaller value, and detects a bottom in the arbitrary zone.

The arbitrary detection zone of the zone peak detection circuit 62 and the zone bottom detection circuit 63 takes an important role for accurately detecting the address polarity information 60 and the address position information 61, and therefore, it should be set so as to follow a change in the wobble signal and to detect a peak envelope and a bottom envelope in the CAPA area, according to the format of the recorded digital data and the cycle of the wobble signal component. Thereby, greater part of the wobble signal component can be removed when detecting the address polarity information and the address position information, and further, the envelope in the required CAPA area can be detected sensitively. Further, since the address polarity information and the address position information can be accurately detected even when a lot of noise is superimposed on the push-pull signal, the resistance-to-noise of the optical disc recording/playback apparatus is improved. For example, it is desirable that, on the DVD-RAM disk, the detection zone is set shorter than the wobble signal cycle corresponding to the 186 channel bit cycle and larger than a VFO (Voltage Frequency Oscillator) pattern that is a continuous pattern of the 8-channel bit cycle in the address section.

Figure 6:
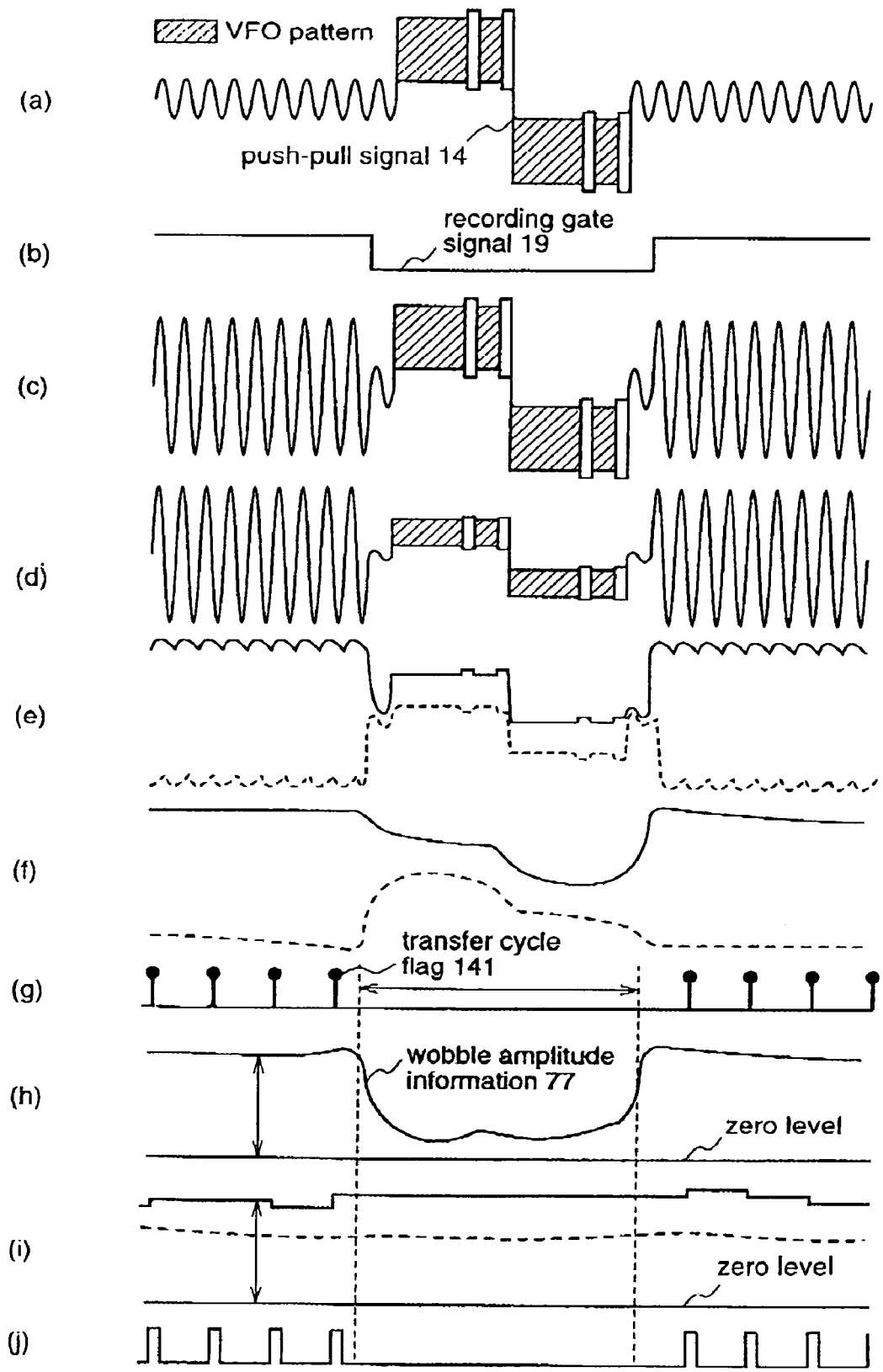
FIG. 6 is a diagram for explaining the principle of generating wobble amplitude information according to the first embodiment.
Figure 7:
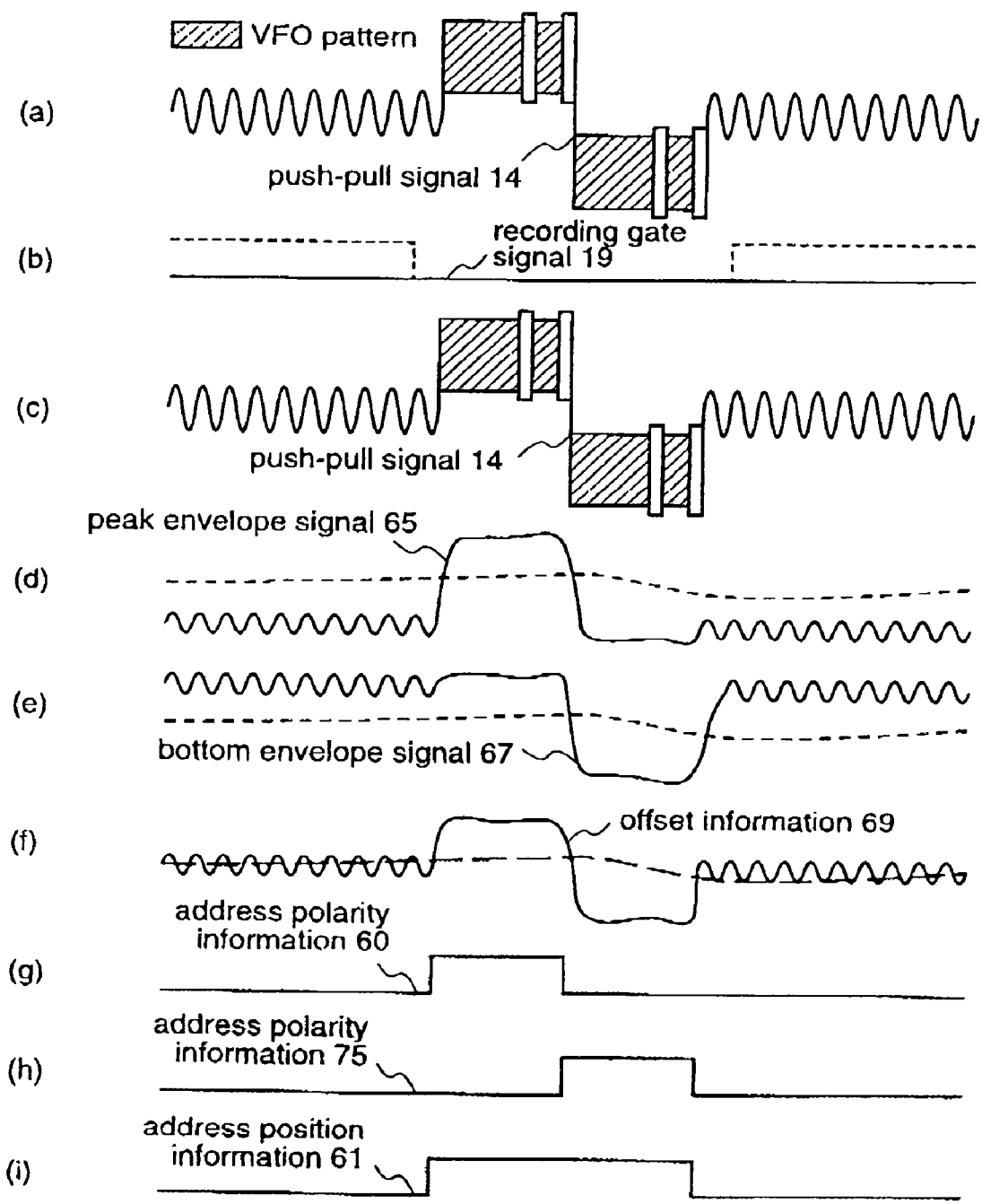
FIG. 7 is a diagram for explaining the principle of generating address polarity information and address position information during playback according to the first embodiment.

FIG. 12 is a diagram illustrating a data format of the address area in the DVD-RAM disk, wherein numerals indicate the number of bytes in each area. Each of VFO1 and VFO2 is constituted by a 4T (T: channel bit frequency) signal pattern, and a sampling clock 37 for PLL lock is generated in the address area utilizing this signal as well. AM (Address Mark) indicates an address mark signal which is a sync signal for detecting the beginning of a PID (Physical ID). Each of PID1~PID4 is 4-byte data, wherein the first 1 byte is sector data and the next 3 bytes are sector numbers, and this data is recorded by 8-16 modulation. IED1~IED4 are error detection codes for the respective PIDs. PA1 and PA2 are codes for recognizing demodulation states of data just before PA. Shaded areas shown in FIGS. 5 to 7 are VFO patterns which are 4T continuous patterns. In such address area, it is important to remove high-frequency noise components from the push-pull signal 14 and the digital sampling signal 38 while maintaining the amplitude information of VFO patterns as described above.

Therefore, the zone peak value outputted from the zone peak detection circuit 62 is input to the first envelope detection circuit 64, wherein a high-frequency noise component thereof is removed. A peak envelope signal 65 outputted from the first envelope detection circuit 64 is a signal as shown by a solid line in FIG. 5(e) and FIG. 7(d). On the other hand, the zone bottom value outputted from the zone bottom detection circuit 63 is input to the second envelope detection circuit 66, wherein a high-frequency noise component thereof is removed. A bottom envelope signal 67 outputted from the second envelope detection circuit 66 is a signal as shown by a solid line in FIG. 5(f) and FIG. 7(e).

As described above, since the sampling clock 37 is generated according to the channel bit cycles of the data area and the address area, it is possible to carry out automatic switching between a low-speed detection that is not affected by the wobble cycle in the data area and a high-speed detection that is needed for reproduction of the address information in the address area, thereby realizing detection optimum to each area. Therefore, connection of analog signal processing and digital signal processing can be integrated to the processed push-pull signal. Thereby, it becomes unnecessary to have two converters, i.e., a low-speed AD converter for detecting wobble information and a high-speed AD converter for detecting address information, and only a single high-speed AD converter is needed. As a result, when this circuit is implemented by a semiconductor integrated circuit, allocation of functions between an analog circuit and a digital circuit can be clarified.

The offset detection circuit 68 to which the peak envelope signal 65 and the bottom envelope signal 67 are input adds these signals, and halves the gain, thereby extracting offset information 69 as indicated by a solid line in FIG. 5(g) and FIG. 7(f). The offset information 69 detected by the offset detection circuit 68 is input to the amplitude low-pass variation detection circuit 70, and thereafter, converted into a signal from which a low-pass variation component is extracted, as shown by a dotted line in FIG. 5(g) and FIG. 7(f). An arbitrary offset level is added to the output signal of the amplitude low-pass variation detection circuit 70 by the first threshold detection circuit 71, whereby the signal is converted to a threshold level as shown by a dotted line in FIG. 5(e) and FIG. 7(d). The output signal of the first envelope detection circuit 64 as shown by a solid line in FIG. 5(e) and FIG. 7(d) and the output signal of the first threshold detection circuit 71 as shown by a dotted line in FIG. 5(e) and FIG. 7(d) are input to the first signal polarity determination circuit 72 to be compared with each other, thereby generating address polarity information 60 as shown in FIG. 5(h) and FIG. 7(g). The address polarity information 60 is a signal that becomes "1" in the front CAPA when the light spot scans the groove track, and it may be a signal that becomes "1" in the rear CAPA when the light spot scans the land track.

On the other hand, an arbitrary offset level is added to the output signal of the amplitude low-pass variation detection circuit 70 by the second threshold detection circuit 73, whereby the signal is converted to a threshold level as shown by a dotted line in FIG. 5(f) and FIG. 7(e). The output signal of the second envelope detection circuit 66 as shown by a solid line in FIG. 5(f) and FIG. 7(e) and the output signal of the second threshold detection circuit 73 as shown by a dotted line in FIG. 5(f) and FIG. 7(e) are input to the second signal polarity determination circuit 74 to be compared with each other, thereby generating address polarity information 75 as shown in FIG. 5(i) and FIG. 7(h). The address polarity information 75 is a signal that becomes "1" in the front CAPA when the light spot scans the land track, and it may be a signal that becomes "1" in the rear CAPA when the light spot scans the groove track.

The address position detection circuit 76 adds the address polarity information 60 and the address polarity information 75 using an OR circuit or the like to generate address position information 61. The address position information 61 may be a signal that becomes "H" in a position where the CAPA signal exists as shown in FIG. 5(j) and FIG. 7(i). Further, the address position detection circuit 76 may be provided with a function of masking the detected address position information 61 with a CAPA area signal 39 to be described later. This mask function prevents the address position information 61 from being detected at an incorrect position, whereby detection of the address information is stabilized.

The address polarity information 60 and the address position information 61, which are detected by the above-mentioned sequence of operations are input to the optical disc controller 16, and thereafter, used not only as a reference for generating a CAPA area signal 39 but also as a signal for performing tracking control so as to switch the track between the land track and the groove track which are alternately repeated for every cycle, thereby enabling alternate playback of the address area and the digital data recording area. Further, during recording, it becomes possible to record digital data in the digital data recording area while reproducing the wobble amplitude information and the address information.

Next, the output signal of the wobble amplitude information preprocessing circuit 54 is input to the wobble amplitude information detection circuit 78, wherein wobble amplitude information 77 is detected.

Hereinafter, the detailed circuit structure and operation of the wobble amplitude information detection circuit 78 will be described with reference to FIG. 13. The circuit structure shown in FIG. 13 is merely an example, and the present invention is not restricted thereto.

Figure 13:
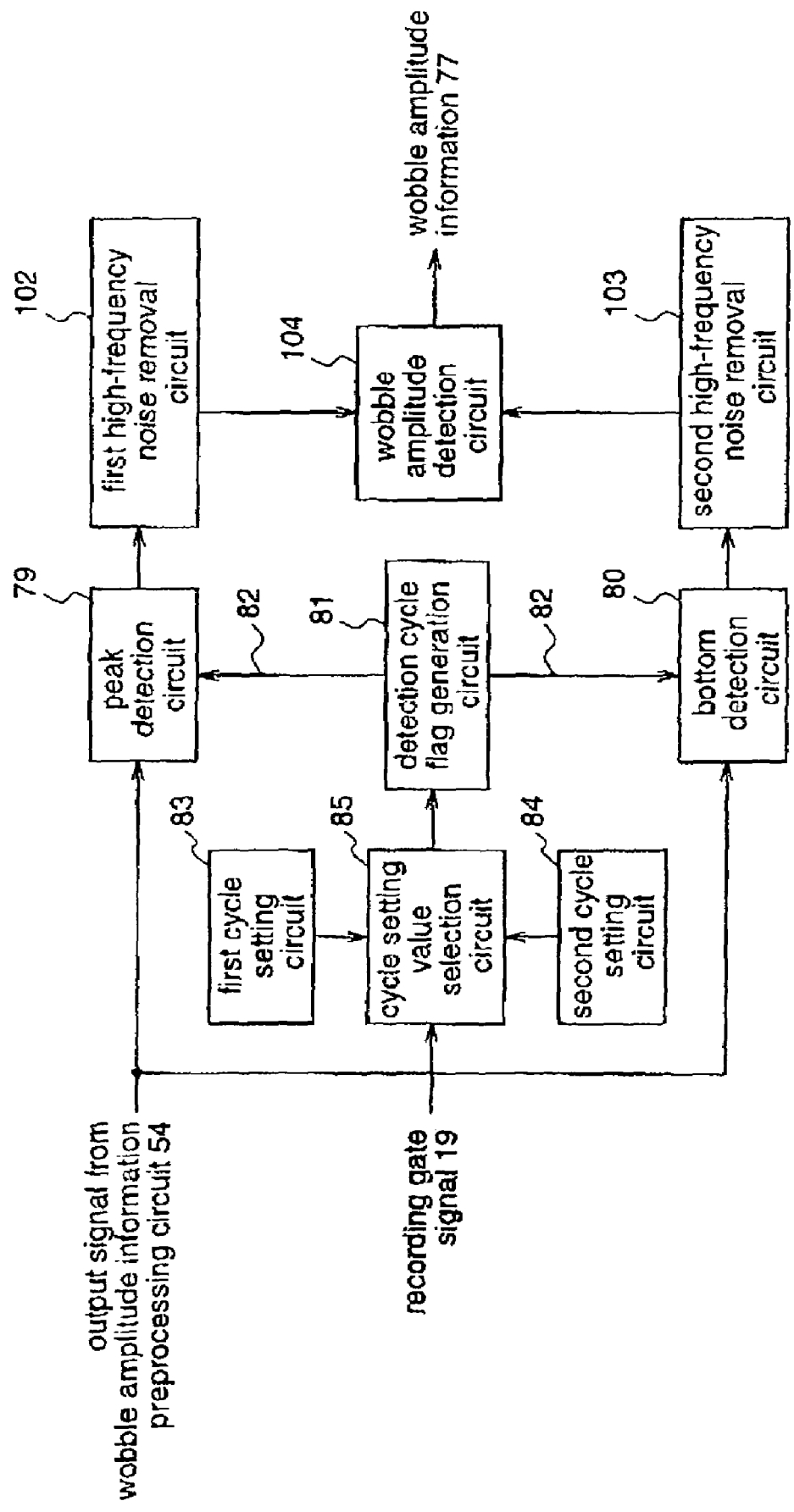
FIG. 13 is a block diagram illustrating a wobble amplitude information detection circuit according to the first embodiment.

FIG. 13 is a block diagram illustrating the construction of the wobble amplitude information detection circuit 78.

In FIG. 13, a peak detection circuit 79 detects a peak level in an arbitrary zone, of the level of the output signal of the wobble amplitude information preprocessing circuit 54 from which an arbitrary value is subtracted. The detail of the peak detection circuit 79 will be described later. A bottom detection circuit 80 detects a bottom level in an arbitrary zone, of the level of the output signal of the wobble amplitude information preprocessing circuit 54 to which an arbitrary value is added. The detail of the bottom detection circuit 80 will be described later.

A detection cycle flag generation circuit 81 generates a detection cycle flag 82 which determines arbitrary detection zones of the peak detection circuit 79 and the bottom detection circuit 80.

A first cycle setting circuit 83 sets a generation cycle of the detection cycle flag 82 in the playback state. A second cycle setting circuit 84 sets a generation cycle of the detection cycle flag 82 in the recording state.

A cycle set value selection circuit 85 selects and outputs either the output signal of the first cycle setting circuit 83 or the output signal of the second cycle setting circuit 84 according to the recording gate signal 19.

A first high frequency noise removal circuit 102 removes a high frequency noise component from the output signal of the peak detection circuit 79. The detail of the first high frequency noise removal circuit 102 will be described later. A second high frequency noise removal circuit 103 removes a high frequency noise component from the output signal of the bottom detection circuit 80. The detail of the second high frequency noise removal circuit 103 will be described later.

A wobble amplitude detection circuit 104 generates wobble amplitude information 77 on the basis of the output signal of the first high frequency noise removal circuit 102 and the output signal of the second high frequency noise removal circuit 103.

Next, the operation of the wobble amplitude information detection circuit 78 will be described.

A signal that is output from the wobble amplitude information preprocessing circuit 54 with reference to the sampling clock 37 generated from the clock generation circuit 36 is input to the peak detection circuit 79 and to the bottom detection circuit 80. The peak detection circuit 79 compares the result of subtracting an arbitrary value from the peak level that is held for every sampling clock 37 with the input signal, and holds a larger value, and simultaneously, detects a peak level in an arbitrary zone, and outputs the peak level to the first high frequency noise removal circuit 102.

Figure 14A:
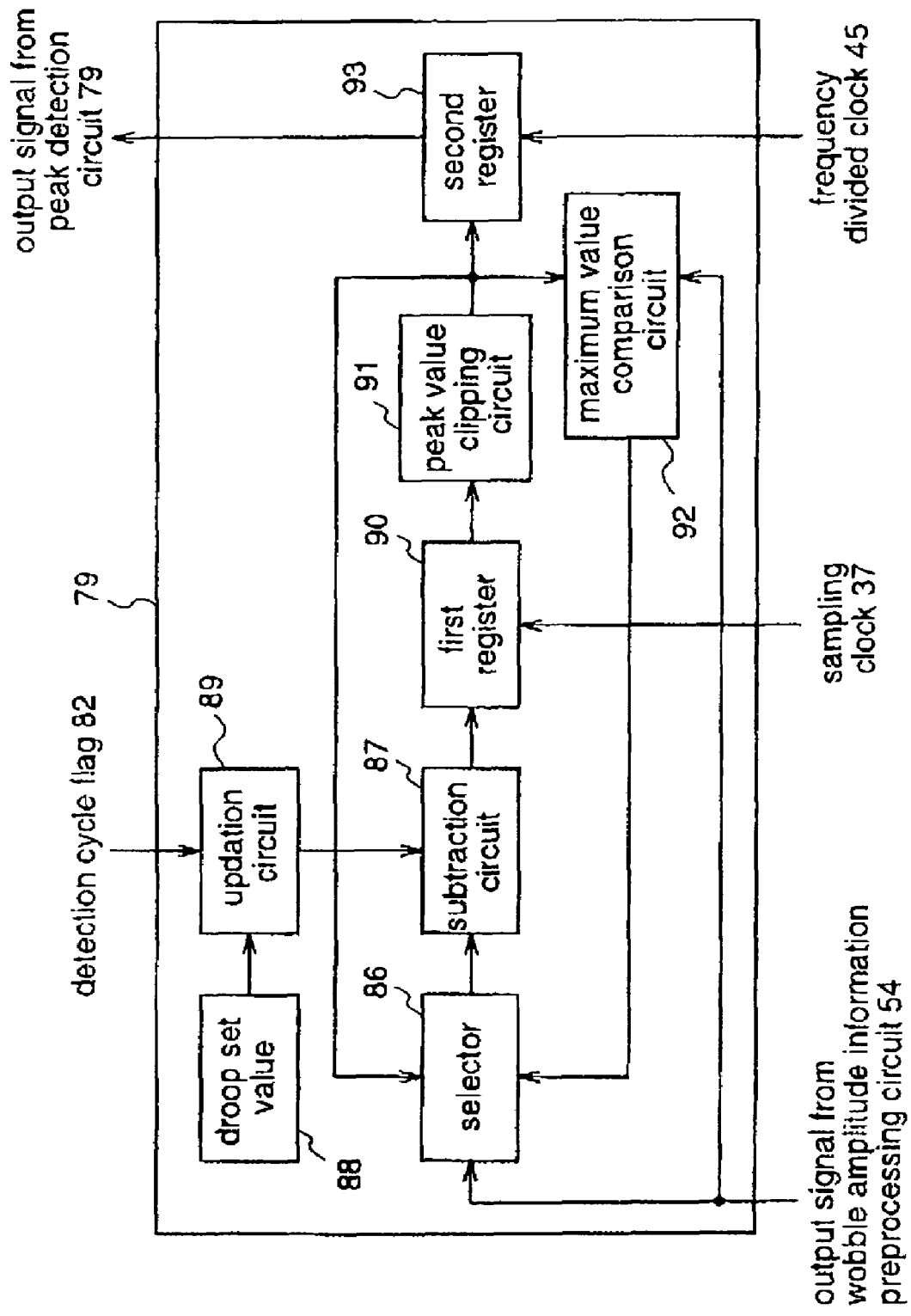
FIG. 14(a) is a block diagram illustrating the construction of a peak detection circuit in a wobble amplitude information detection circuit according to the first embodiment.

The detail of the peak detection circuit 79 will be described with reference to FIG. 14(a). FIG. 14(a) is a block diagram illustrating the construction of the peak detection circuit 79. The peak detection circuit 79 includes, as shown in FIG. 14(a), a droop set value 88, an updation circuit 89, a selector 86, a subtraction circuit 87, a first register 90, a peak value clipping circuit 91, a maximum value comparison circuit 92, and a second register 93. Hereinafter, the operation or the peak detection circuit 79 will be described.

The output signal of the wobble amplitude information preprocessing circuit 54 and the output signal of the peak value clipping circuit 91 to be described later are input to the maximum value comparison circuit 92 and the selector 86. The maximum value comparison circuit 92 compares the output signal of the wobble amplitude information preprocessing circuit 54 with the output signal of the peak value clipping circuit 91, and outputs the result to the selector 86. The selector 86 selects, as an output signal, the signal that is determined as being larger by the maximum value comparison circuit 92, and inputs the selected signal to the subtraction circuit 87.

On the other hand, the updation circuit 89 receives the detection cycle flag 82 and the value that is set by the droop set value 88, and restricts the value that is set by the droop set value 88 within a zone where the detection cycle flag 82 becomes "H" to put output restriction temporally, and outputs the value to the subtraction circuit 87. The subtraction circuit 87 subtracts the output signal of the updation circuit 89 from the output signal of the selector 86. The output signal of the subtraction circuit 87 is input to the first register 90 which holds the digital signal with reference to the sampling clock 37. The output signal of the first register 90 is input to the peak value clipping circuit 91. For example, in the case where the output signal is subjected to twos complement operation of 7 bits, if the input signal is larger than "63" that is the maximum value at the positive side, the input signal is clipped at "63" and outputted. Otherwise, the input signal is subjected to 7-bits restriction and outputted. The output signal of the peak value clipping circuit 91 is input to the second register 93 that holes the digital signal on the basis of the division clock 45, wherein an output signal that varies on the basis of the division clock 45 is generated. The output signal of the peak detection circuit 79 thus obtained is a signal as shown by a solid line in FIG. 6(e).

Figure 14B:
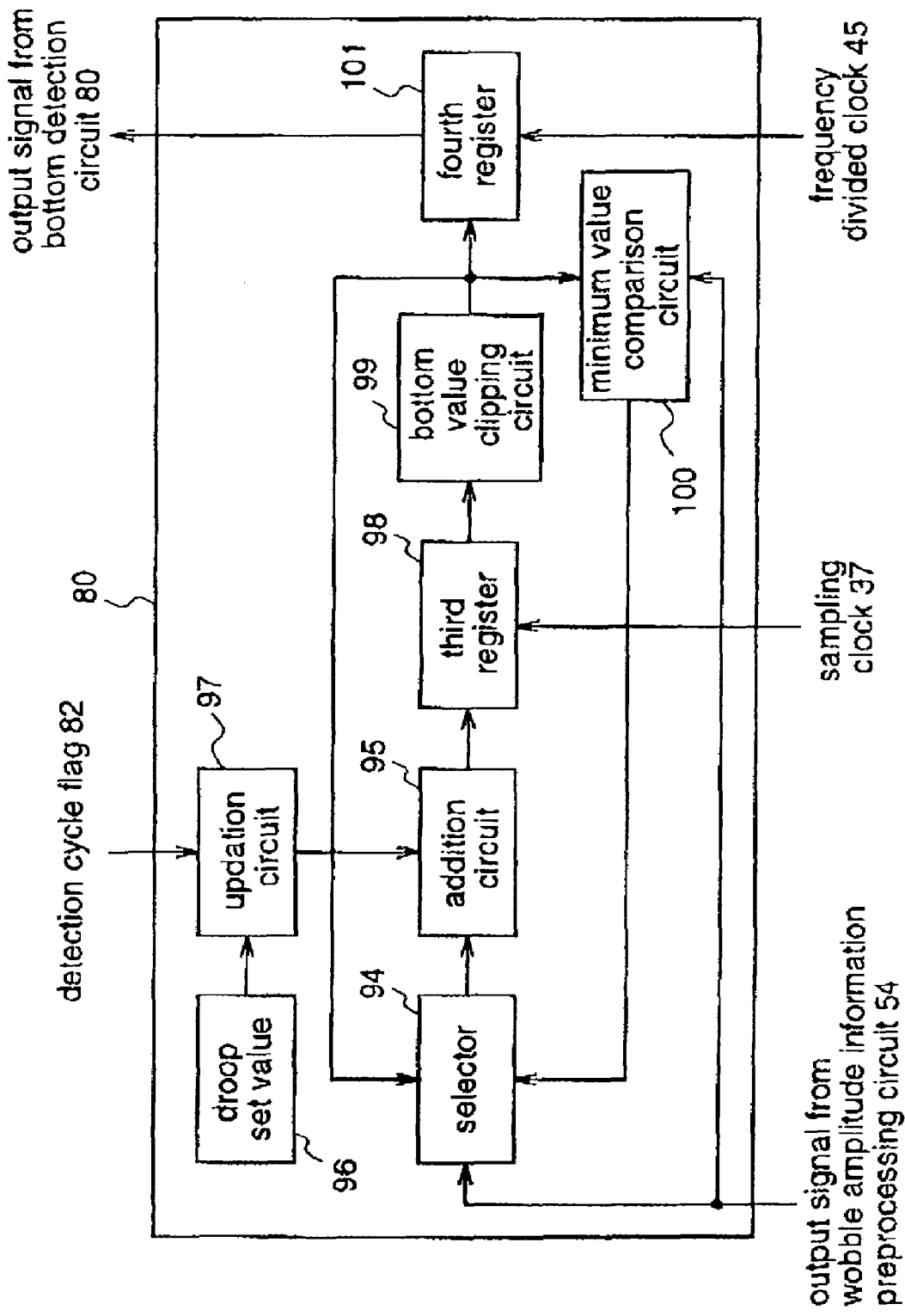
FIG. 14(b) is a block diagram illustrating the construction of a bottom detection circuit in the wobble amplitude information detection circuit according to the first embodiment.

Next, the bottom detection circuit 80 compares the result of adding an arbitrary value to the bottom level that is held for every sampling clock 37, with the input signal, and holds a smaller value, and simultaneously, detects a bottom level in an arbitrary zone and outputs the bottom level to the second high-frequency noise removal circuit 103. The detail of the bottom detection circuit 80 will be described with reference to FIG. 14(b). FIG. 14(b) is a block diagram illustrating the construction of the bottom detection circuit 80.

The output signal of the wobble amplitude information preprocessing circuit 54 and the output signal of the bottom value clipping circuit 99 to be described later are input to a minimum value comparison circuit 100 and a selector 94. The minimum value comparison circuit 100 compares the output signal of the wobble amplitude information preprocessing circuit 54 with the output signal of the bottom value clipping circuit 99, and outputs the result to the selector 94. The selector 94 selects, as an output signal, a signal that is determined as being smaller by the minimum value comparison circuit 100, and inputs the selected signal to an addition circuit 95.

On the other hand, the updation circuit 97 receives the detection cycle flag 82 and the value that is set by the droop set value 96, and restricts the value that is set by the droop set value 96 within a zone where the detection cycle flag 82 becomes "H" to put output restriction temporally, and outputs the value to the addition circuit 95. The addition circuit 95 adds the output signal of the updation circuit 97 to the output signal of the selector 94. The output signal of the addition circuit 95 is input to the third register 98 which holds the digital signal with reference to the sampling clock 37. The output signal of the third register 98 is input to the bottom value clipping circuit 99. For example, in the case where the output signal is subjected to twos complement operation of 7 bits, if the input signal is smaller than "−64" that is the maximum value at the negative side, the input signal is clipped at "−64" and outputted. Otherwise, the input signal is subjected to 7-bits restriction and outputted. The output signal of the bottom value clipping circuit 99 is input to the fourth register 101 that holes the digital signal on the basis of the division clock 45, wherein an output signal that varies on the basis of the division clock 45 is generated. The output signal of the bottom detection circuit 80 thus obtained is a signal as shown by a dotted line in FIG. 6(*e*).

The arbitrary detection zone of the peak detection circuit 79 and the bottom detection circuit 80 is determined by the detection cycle flag 82 that is generated by the detection cycle flag generation circuit 81. The detection cycle flag 82 takes an important role for accurately detecting a peak envelope and a bottom envelop of the wobble signal component, and the detection cycle flag 82 is generated on the basis of either a predetermined generation cycle generated by the first cycle setting circuit 83 or a predetermined generation cycle generated by the second cycle setting circuit 84. That is, the first cycle setting circuit 83 sets the generation cycle for the playback state while the second cycle setting circuit 84 sets the generation cycle for recording state. The cycle set value selection circuit 85, which receives the recording gate signal 19, selects the output signal of the first cycle setting circuit 83 when the recording gate signal 19 is "L" indicating the playback state and selects the output signal of the second cycle setting circuit 84 when the recording (gate signal 19 is "H" indicating the recording state, and outputs the selected signal to the detection cycle flag generation circuit 81. The detection cycle flag generator circuit 81 performs counting by a digital counter or the like in accordance with the sampling clock 37 or the frequency divided clock 45, and generates and outputs a detection cycle flag 82 when the result of the counting matches the output signal of the cycle set value selection circuit 85, and simultaneously, resets the counter. It is desired that the first cycle setting circuit 83 sets, for a DVD-RAM disk, the detection cycle to a value that is smaller than the cycle of the VFO pattern which is a continuous pattern of 8 channel bit cycle existing in the CAPA area, thereby possibly reducing a difference between the output signal of the peak detection circuit 79 and the output signal of the bottom detection circuit 80 during playback. Further, the second cycle setting circuit 84 sets, for a DVD-RAM disk, the detection cycle to a value that is close to 186 channel bit cycle possessed by the wobble signal so that a difference between the output signal of the peak detection circuit 79 and the output signal of the bottom detection circuit 80 during recording can reflect the amplitude information of the wobble signal.

The output signal of the peak detection circuit 79 is input to the first high frequency noise removal circuit 102 which is constituted by a low-pass filter or the like for removing a high frequency noise component, converted into a signal as shown by a solid line in FIG. 6(*f*), and output to the wobble amplitude detection circuit 104. On the other hand, the output signal of the bottom detection circuit 80 is input to the second high frequency noise removal circuit 103 which is constituted by a low-pass filter or the like for removing a high frequency noise component, converted into a signal as shown by a dotted line in FIG. 6(*f*), and output to the wobble amplitude detection circuit 104.

The wobble amplitude detection circuit 104 receives the output signal of the first high frequency noise removal circuit 102 and the output signal of the second high frequency noise removal circuit 103, and subtracts the output signal of the second high frequency noise removal circuit 103 from the output signal of the first high frequency noise removal circuit 102, thereby generating wobble amplitude information 77. The wobble amplitude information 77 thus obtained becomes a signal as shown by a solid line in FIG. 6(*h*) or a signal as shown by a solid line in FIG. 3(*c*). As shown in FIG. 3(*c*), the amount of reflected light decreases in the vicinity of the elliptical shaded area shown in FIG. 3(*a*), the wobble signal component also tends to decrease.

Figure 15:
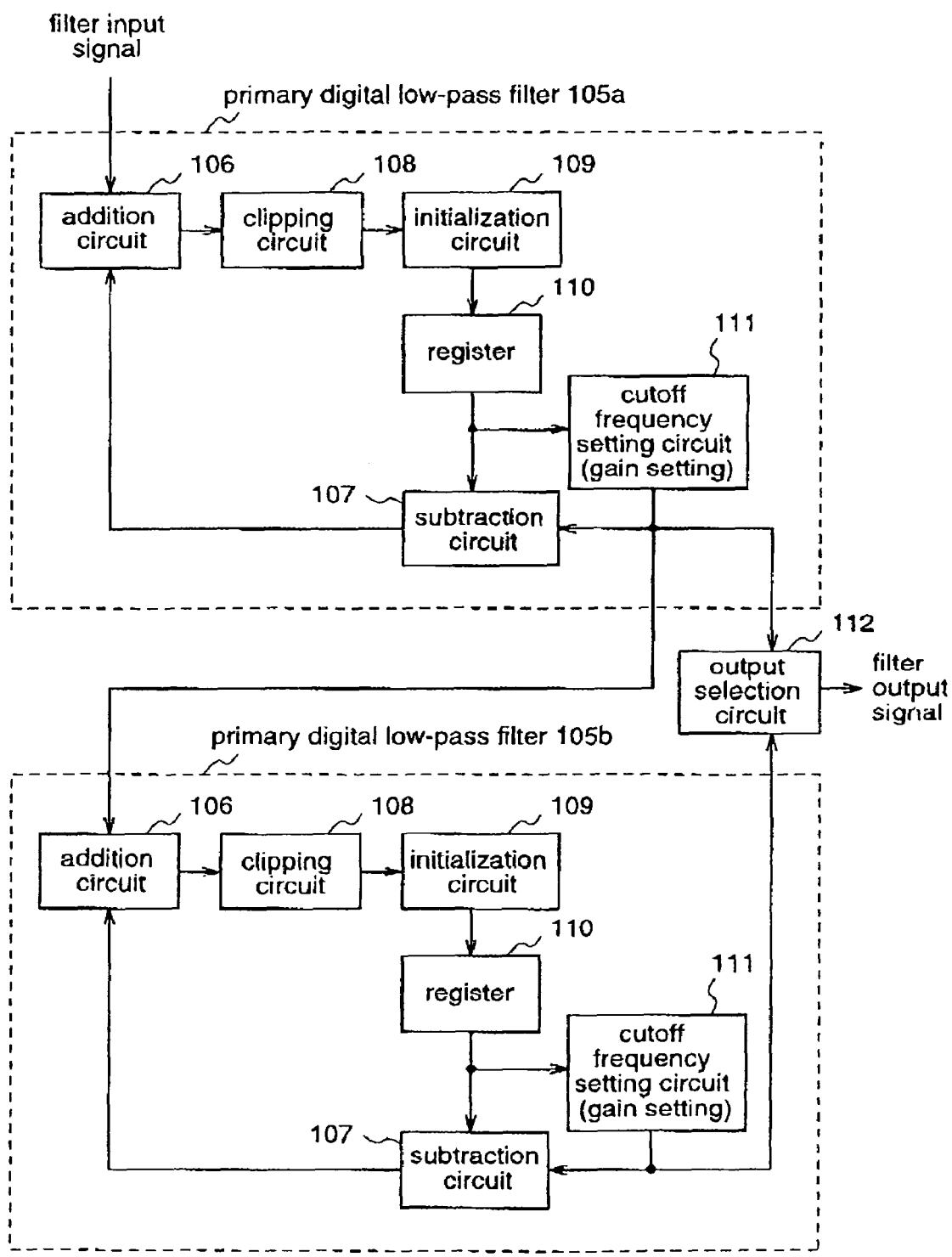
FIG. 15 is a block diagram illustrating the construction of a second-order digital low-pass filter according to the first embodiment.

Each of the first high frequency noise removal circuit 102 and the second high frequency noise removal circuit 103 may be constituted by, for example, a low-pass filter using a digital circuit having a primary order or plural orders. FIG. 15 shows, as example, a second order digital low-pass filter as an application circuit of a recursive filter. Hereinafter, the circuit structure and operation of this second order digital low-pass filter will be described. This circuit is merely an example, and the present invention is not restricted thereto.

With reference to FIG. 15, the second order digital low-pass filter comprises first order digital low-pass filters 105*a* and 105*b* and an output selection circuit 112, and each of the first order digital low-pass filters 105*a* and 105*b* comprises an addition circuit 106, a subtraction circuit 107, a clipping circuit 108, an initialization circuit 109, a register 110, and a cutoff frequency setting circuit 111.

The addition circuit 106 adds the filter input signal that is input to the first order digital low-pass filter 105*a* (105*b*) and the output signal of the subtraction circuit 107 to be described later. The clipping circuit 108 performs restriction with respect to the upper limit and the lower limit of the output signal of the addition circuit 106. The initialization circuit 109 initializes the output signal of the clipping circuit 108 at startup of the first order digital low-pass filter 105*a* (105*b*) and at changing of the drive clock. The register 110 holds the output signal of the initialization circuit 109 at the timing of the drive clock. The cutoff frequency setting circuit 111 sets the cutoff frequency of the first order digital low-pass filter 105*a* (105*b*). The subtraction circuit 107 subtracts the output signal of the first order digital low-pass filter 105*a* as the output signal of the cutoff frequency setting circuit 111 from the output signal of the register 110. The output selection circuit 112 selects either the output signal of the front-stage first order digital low-pass filter 105*a* or the rear-stage first order digital low-pass filter 105*b*, and outputs the selected signal.

Next, the operation of the secondary order digital low-pass filter will be described.

The filter input signal is initially input to the addition circuit 106 of the first order digital low-pass filter 105a, and the addition circuit 106 adds the filter input signal anti the output signal of the subtraction circuit 107. The output signal of the addition circuit 106 is input to the clipping circuit 108. When the upper limit or the lower limit exceeds the maximum bit width, the input signal is clipped to the upper limit or the lower limit that is closest to the maximum bit width. The output signal of the clipping circuit 108 is input to the initialization circuit 109, wherein the signal is initialized at startup of the first order digital low-pass filter 105a and at drive clock changing. The register 110 holds the output signal of the initialization circuit 109 at the timing of the drive clock, and outputs the signal to the subtraction circuit 107 and to the cutoff frequency setting circuit 111. The cutoff frequency setting circuit 111 sets the cutoff frequency of the first order digital low-pass filter 105a and inputs it to the subtraction circuit 107. The cutoff frequency setting circuit 111 may be a bit shift circuit or the like, which simply adjusts the gain. The subtraction circuit 107 subtracts the output signal of the first order digital low-pass filter 105a as the output signal of the cutoff frequency setting circuit 111 from the output signal of the register 110.

Subsequently, the output signal of the first order digital low-pass filter 105a is input to another first order digital low-pass filter 105b in the rear stage. The rear-stage first order digital low-pass filter 105b fundamentally has the same function and operates in the same manner as the above-mentioned first order digital low-pass filter 105a. The output signal of the front-stage first order digital low-pass filter 105a and the output signal of the rear-stage first order digital low-pass filter 105b are input to the output selection circuit 112, wherein either of these signals is selected and outputted. Thereby, either the performance of the first order filter or the performance of the second order filter can be selected for the second order digital low-pass filter shown in FIG. 15.

The digital low-pass filter having one to plural orders, which is realized by connecting a sequence of recursive filters in series, enables removal of a high frequency noise component of the filter input signal. By applying such simple recursive digital low-pass filters, the circuit scale of the digital circuit can be reduced, leading to a reduction in the cost of the optical disc recording/playback apparatus.

Further, the clock for driving the register 110 determines the cutoff range of the second order digital low-pass filter shown in FIG. 15, and it may be a clock in proportion to the frequency divided clock 45 generated in the clock generation circuit 36. In this way, when the register 110 is driven with the frequency-divided clock 45 whose division ratio is larger than that of the sampling clock 37, the processing delay time becomes shorter as the division ratio is smaller, and the circuit scale increases as the cutoff frequency is lowered with respect to the channel bit frequency of the recorded digital data. On the other hand, the processing delay time is increased as the division ratio of the frequency-divided clock 45 is increased, and the circuit scale is reduced as the cutoff frequency is lowered with respect to the channel bit frequency of the recorded digital data. Especially when obtaining the wobble amplitude information 77, use of the frequency-divided clock 45 having a large division ratio makes it possible to realize, with a small-scale semiconductor integrated circuit, a digital signal processing circuit which can operate in a frequency band that is sufficiently lower than the channel frequency of the recorded digital data, thereby further increasing the effects of reducing the cost and power consumption.

Next, the wobble amplitude information 77 outputted from the wobble amplitude information detection circuit 78 is input to the recording laser power control circuit 113, thereby generating a recording laser power control signal 115 for controlling the laser power at recording of digital data, in synchronization with variations in the wobble amplitude information 77.

Initially, the control principle of the recording laser power control circuit 113 will be described.

The wobble amplitude information 77 outputted from the wobble amplitude information detection circuit 78 is input to the recording laser power control circuit 113. At this time, the recording gate signal 19 and a fundamental recording pulse 114 for recording target digital data, which is generated from the optical disc controller 16, are also input to the recording laser power control circuit 113. The recording laser power control circuit 113 generates a recording laser power control signal 115 when, for example, a defect due to flaws or stains on the recording surface is detected as shown by the elliptical shaded part in FIG. 3(a) and the recording gate signal 19 is "H" indicating the recording state as shown in FIG. 3(b). To be specific, when the wobble amplitude information 77 becomes smaller than the low-pass variation information as shown by a dotted line in FIG. 3(c) which is detected from the wobble amplitude information 77 by a low-pass filter or the like, a recording laser power control signal 115 as shown in FIG. 3(d) is generated to increase the recording laser power, thereby maintaining the quality of the recorded data.

More specifically, in the case where the defect exists in the data area shown in FIG. 3(a), when the light spot crosses the defect, the power of the reflected light is lowered from level Pr0 to level Pr1 is shown in FIG. 3(c). Further, as shown in FIG. 3(d), in the period T1 during which the light spot crosses the gap area, the laser generation circuit 4 performs test emission for low-speed power changing. In this test emission, two values of powers, power Pkt and power Pbt, are generated as shown in FIG. 3(d), thereby performing fundamental optimum control of the recording laser power which depends on temperature change or the like. When the period T1 for the test emission is ended, the light spot enters the data area T2. In this period, as shown in FIG. 3(d), emission is carried out such that three values of powers (Pk, Pb1, Pb2) for performing accurate recording are switched at high speed. These three values of powers are obtained by an emission light control circuit (not shown). When the light spot is crossing the defect, the output power of the laser light is partially scattered or absorbed by the defect, and the appropriate power for recording the digital data on the optical disc medium 1 is undesirably changed. As a result, the power level of the reflected light from the optical disc medium 1 is lowered to the power Pr1 from the power Pr0 at which no defect exists. On the other hand, in the period T3 during which the light spot crosses the defect, the loss in the power level of the reflected light due to the defect is detected from the wobble amplitude signal, and the laser power is controlled to compensate this loss.

That is, the recording laser power control circuit 113 controls the laser power to an appropriate value so that the recording quality of digital data is improved against partial variations caused by environmental variation such as temperature or flaws and stains.

Hereinafter, the detailed construction and operation of the recording laser power control circuit 113 will be described with reference to FIG. 20. The circuit construction shown in FIG. 20 is merely an example, and the present invention is not restricted thereto.

Figure 20:
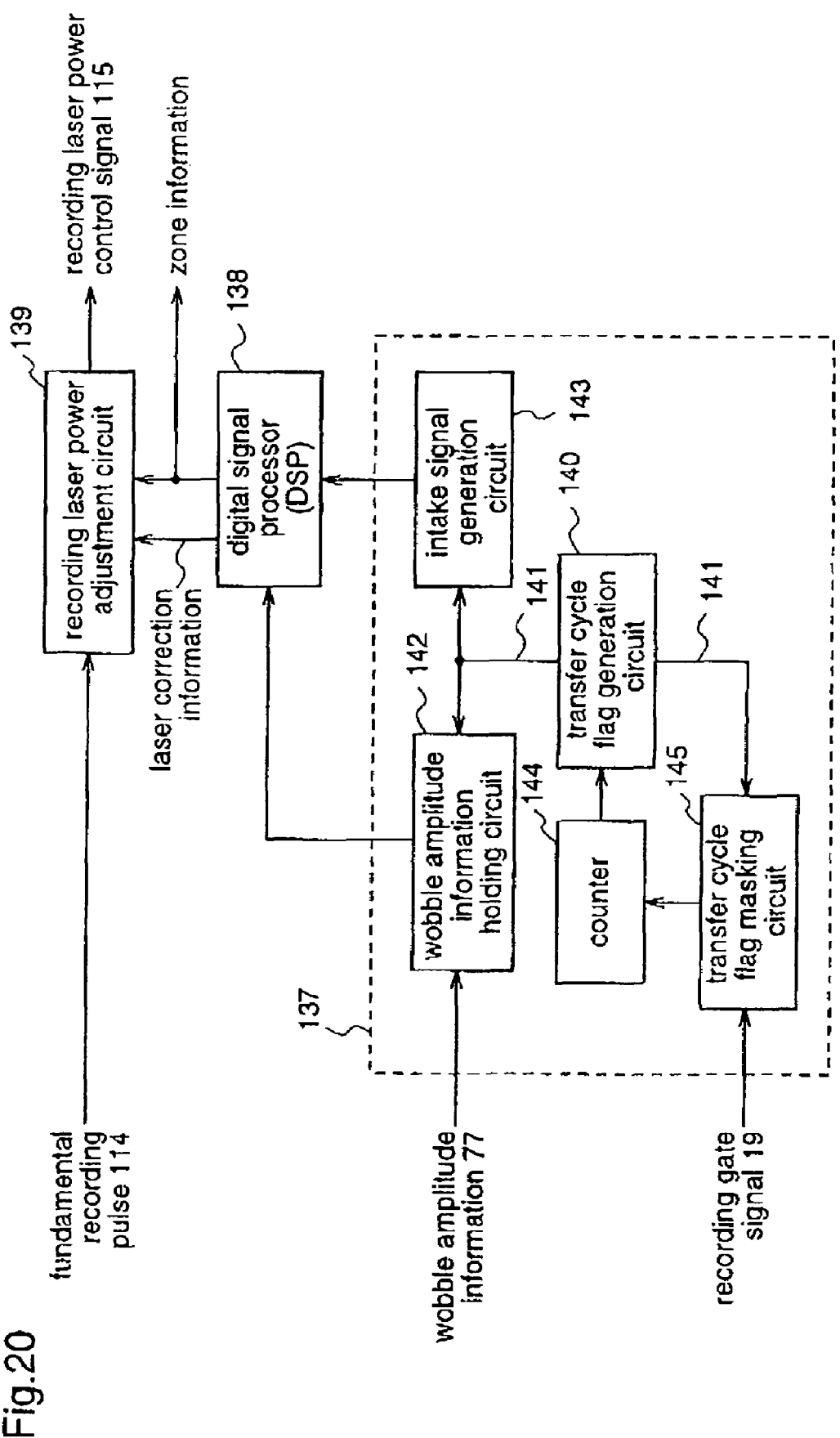
FIG. 20 is a block diagram illustrating the construction of a recording laser power control circuit according to the first embodiment.

FIG. 20 is a block diagram illustrating the construction of the recording laser power control circuit 113.

As shown in FIG. 20, the recording laser power control circuit 113 comprises a wobble amplitude information transfer circuit 137, a digital signal processor (hereinafter referred to as a DSP) 138, and a recording laser power adjustment circuit 139.

The wobble amplitude information transfer circuit 137 correctly transfers the wobble amplitude information 77 which varies with reference to the sampling clock 37 and the frequency-divided clock 45 and is suited to recording laser power control, according to the recording speed, to the DSP 138 that is operated with a fixed clock. The wobble amplitude information transfer circuit 137 comprises a transfer cycle flag generation circuit 140 for generating a transfer cycle flag 141 as an impulse signal, a wobble amplitude information holding circuit 142 for holding the wobble amplitude information 77 at the tinting of the transfer cycle flag 141 and transferring it to the DSP 138, an intake signal generation circuit 143 for generating an intake signal with reference to the transfer cycle flag 141 and outputting it to the DSP 138, a counter 144, and a transfer cycle flag masking circuit 145 for generating a reset pulse that temporarily initializes the counter 144, on the basis of the transfer cycle flag 141.

The DSP 138 generates recording laser power control information for controlling the laser power during recording of digital data, on the basis of the wobble amplitude information that is correctly transferred.

The recording laser power adjustment circuit 139 generates a recording laser power control signal 115 by varying the laser power during recording with the recording laser power control information that is synchronized with variations in the wobble amplitude information.

Next, the operation of the recording laser power control circuit 113 will be described.

In the wobble amplitude information transfer circuit 137, the transfer cycle flag generation circuit 140 generates a transfer cycle flag 141 as shown by an impulse-shaped signal in FIG. 6(*g*), when the value counted by the counter 144 matches the target transfer cycle. The wobble amplitude information holding circuit 142 holds the wobble amplitude information 77 as shown by the solid line in FIG. 6(*h*) at the timing of the transfer cycle flag 141 shown in FIG. 6(*g*), and processes the information 77 into a signal as shown by a solid line in FIG. 6(*i*), and thereafter, transfers the signal to the DSP 138. At this time, the intake signal generation circuit 143 generates an intake signal as shown in FIG. 6(*j*) and transfers it to the DSP 138 with reference to the transfer cycle flag 141, and the DSP 138 takes the output signal of the wobble amplitude information holding circuit 142 at the falling edge of the intake signal, whereby the digital signal can be accurately transferred between different clocks that are asynchronous with each other. The transfer cycle flag masking circuit 145 generates a reset pulse by the transfer cycle flag 141 and outputs it to the counter 144, and the counter 144 is temporarily initialized by the reset pulse and then resumes counting.

The transfer cycle flag generation circuit 140 may have a function of resetting the counter 144 by the transfer cycle flag masking circuit 145 so as not to hold the wobble amplitude information 77 when the recording gate signal 19 shown in FIG. 6(*b*) is "L" indicating the playback state. At this time, since no transfer cycle flag 141 occurs in the CAPA area, the wobble amplitude information holding circuit 142 is prevented from holding the CAPA signal which may cause scattering of the wobble amplitude information. Thereby, a necessary component of the wobble amplitude information 77 can be utilized as information on the DVD-RAM disk for only in the recording state, resulting in stable control of the recording laser power.

Then, the DSP 138 extracts a low-pass variation component as shown by a dotted line in FIG. 6(*i*) from the output signal of the taken wobble amplitude information holding circuit 142, using a programmed low-pass filter or the like. When the solid line shown in FIG. 6(*h*) is below the dotted line shown in FIG. 6(*i*), the zone information, and the laser correction information which is generated by operating, with the DSP 138, the numerical value of the laser power that is able to approximate the power level of the reflected light indicating the wobble amplitude information shown in FIG. 3(*c*) to the Pr0 by correcting the Pr1 as the attenuation width, are input to the recording laser power adjustment circuit 139, and the control target value of the recording laser power indicated by the fundamental recording pulse 114 is increased according to the amplitude value shown by the solid line in FIG. 6(*h*).

The recording laser power adjustment circuit 139 varies the laser power so as to maintain the recording quality, on the basis of the laser correction information based on the wobble amplitude information, and the zone information synchronized with the variations in the wobble amplitude information, thereby generating a recording laser power control signal 115.

With the above-mentioned circuit construction and sequence of operations, the recording laser power control circuit 113 can perform appropriate controls for not only the wobble amplitude information but also the recording power under various conditions, thereby further improving the quality of the recorded data. For example, the degree of freedom in application of the laser power control circuit 113 is increased with respect to appropriate adjustments for the material and recording speed of the optical disc medium, and appropriate adjustments against temperature variations in the optical disc recording/playback apparatus and variations in performance of the pickup, by using the DSP 138.

Since the DSP 138 realizes the above-mentioned laser power control and other functions with a high degree of freedom, it can try to realize various functions by programming, and it is known that, as the clock used for the circuit operation, a fixed clock is preferable rather than the sampling clock 37 or the frequency divided clock 45 that varies with time. When the laser power during recording to an appropriate value is controlled by the DSP 138 that operates with a fixed clock, considering various factors including the temperature, performance of the optical pickup, variations in the circuit, etc., there occurs asynchronous crossing-over of the wobble amplitude information between the fixed clock and the sampling clock that generates the wobble amplitude information. However, since the wobble amplitude information transfer circuit 137 for transferring the wobble amplitude information is provided, the wobble amplitude information can be transferred without error. Further, even during high-speed recording, the wobble amplitude information can be speedily transferred to the DSP 138 by shortening the transfer cycle, whereby appropriate control of the laser power during high-speed recording can be realized. Furthermore, even when a CAPA area having no wobbles exists, since the wobble amplitude information to be transferred to the DSP 138 is not updated in that area, the precision of the wobble amplitude information is increased, resulting in an increase in the recording performance in the medium where CAPA exists.

Figure 21:
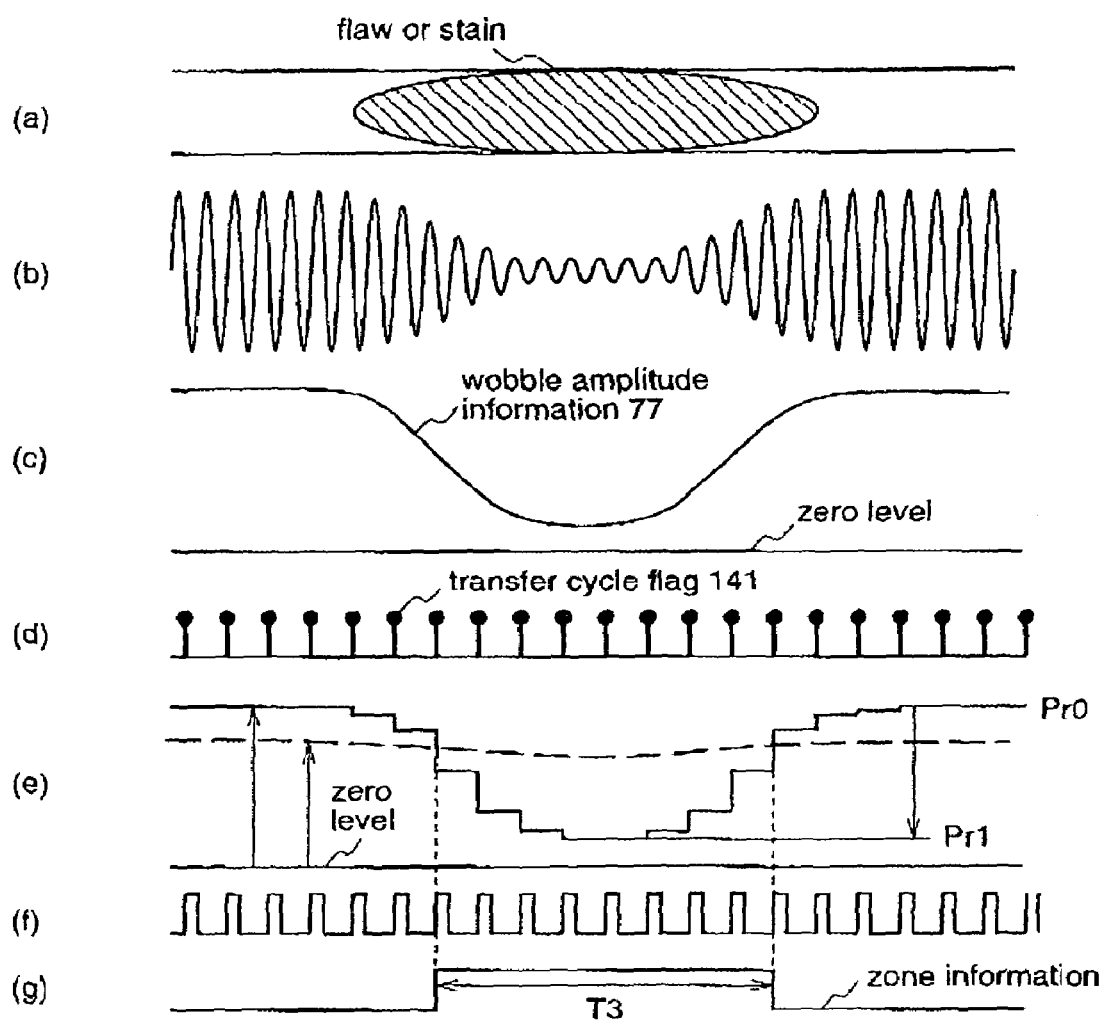
FIG. 21 is a diagram for explaining the operation principle of the recording laser power control circuit according to the first embodiment.

On the other hand, the zone information obtained by the operation performed in the DSP 138 is input to the optical disc controller 16, an the length of the zone is determined. That is, when the optical disc controller 16 determines that there is a possibility that the recorded digital data cannot be demodulated within the above-mentioned zone length, the optical disc controller 16 halts the recording operation, and resumes recording of digital data which have been lost by the recording interruption, stating from a safe area of the recording surface where no defect due to flaws and defects exists, which area appears next. Hereinafter, a description will be given of a sequence of operations of the optical disc controller 16 in the case where defects such as flows or stains exist on the recording surface of the optical disc, with reference to FIG. 21.

When a defect due to flaws and stains, such as an elliptical shaded part in FIG. 21(a), exists along the track in which digital data are recorded, the amplitude of the wobble signal component outputted from the light difference signal shaping circuit 21 is attenuated during recording due to the defect, as shown in FIG. 21(b). The wobble amplitude information 77 detected by the wobble amplitude information detection circuit 78 by the above-mentioned operation becomes a signal as shown in FIG. 21(c). The wobble amplitude information 77 is processed into a signal as shown by a solid line in FIG. 21(e) at the timing of the transfer cycle flag 141 as shown by an impulse-shaped signal in FIG. 21(d), which is generated by the transfer cycle flag generation circuit 140, and thereafter, transferred to the DSP 138 accordingly to an intake signal as shown in FIG. 21(f), by the wobble amplitude information transfer circuit 137. The DSP 138 extracts a low-pass variation component as shown by a dotted line in FIG. 21(e), and generates zone information as shown in FIG. 21(g) when the solid line in FIG. 21(e) is below the dotted line in FIG. 21(e). Then, a zone where the zone information is "H" is input to the recording laser power adjustment circuit 139 and to the optical disc controller 16, whereby the control target value of the recording laser power which is indicated by the fundamental recording pulse 114 is increased according to the amplitude value indicated by the solid line in FIG. 21(e). The zone information shown in FIG. 21(g) shows the zone "T3" in FIG. 3(c), and it becomes an indicator for generating a recording laser power control signal 115 that increases the recording laser power, in the zone "T3" shown in FIG. 3(d). That is, when the amplitude of the wobble amplitude information is attenuated as compared with the appropriate one, the recording quality of the digital data can be ensured by increasing the laser power. When the optical disc controller 16 determines that the zone length might be a zone length in which the recorded digital data cannot be demodulated, the optical disc controller 16 hails the recording operation, and resumes recording of the digital data which have been lost due to the recording interruption after detecting a safe area.

That is, the above-mentioned control using the length of the defect zone by the optical disc controller 16 enables accurate control and exact judgment in skip recording in which, when a defect exists over a large area, the digital recording is halted, and resumed starting from a point that follows the defect area and is not affected by the defect. When this skip recording functions correctly, the quality of the recorded digital data is ensured. Therefore, it becomes unnecessary to provide a function for managing the recording quality, in which the recorded data is reproduced to determine whether the quality thereof is good or not, and when it is not good, the data judged as being not good is rewritten in another area, and further, a reduction in recording time is also achieved.

On the other hand, the playback RF signal 119 may be generated, as shown in FIG. 1, by full adding the whole output signal component from the four-split photodetector 5 of the optical pickup 3 and the whole output signal component from the two-split photodetector 6 for focus error detection by the playback signal detection circuit 118. Hereinafter, the operation of generating the playback RF signal 119 will be described. However, the following description is merely an example, and the present invention is not restricted thereto.

As shown in FIG. 1, the detected currents outputted from the four parts 5a to 5d of the four-split photodetector 5 are converted into voltages by the current-to-voltage (I/V) converters 7 to 10, respectively. Further, the current-to-voltage (I/V) converters 116 and 117 convert the detected currents outputted from the two parts 6a and 6b of the two-split photodetector 6 into voltages, respectively. The playback signal detection circuit 118 adds the outputs of the adders 11 and 12 and the output voltages of the I/V converters 116 and 117 to generate a playback RF signal 119. The playback signal detection circuit 118 may generate the playback RF signal 119 by full addition of the voltage which are obtained by converting only the output components of the four-split photodetector 5 with the I/V converters 7 to 10, respectively.

The playback RF signal 119 is input to the digital data reproduction circuit 120, thereby generating RF amplitude information 121 for focus servo, an offset correction signal 122, and a binarized digital signal 123.

Hereinafter, the detailed circuit structure and operation of the digital data reproduction circuit 120 will be described with reference to FIG. 16. The circuit structure shown in FIG. 16 is merely an example, and the present invention is not restricted thereto.

Figure 16:
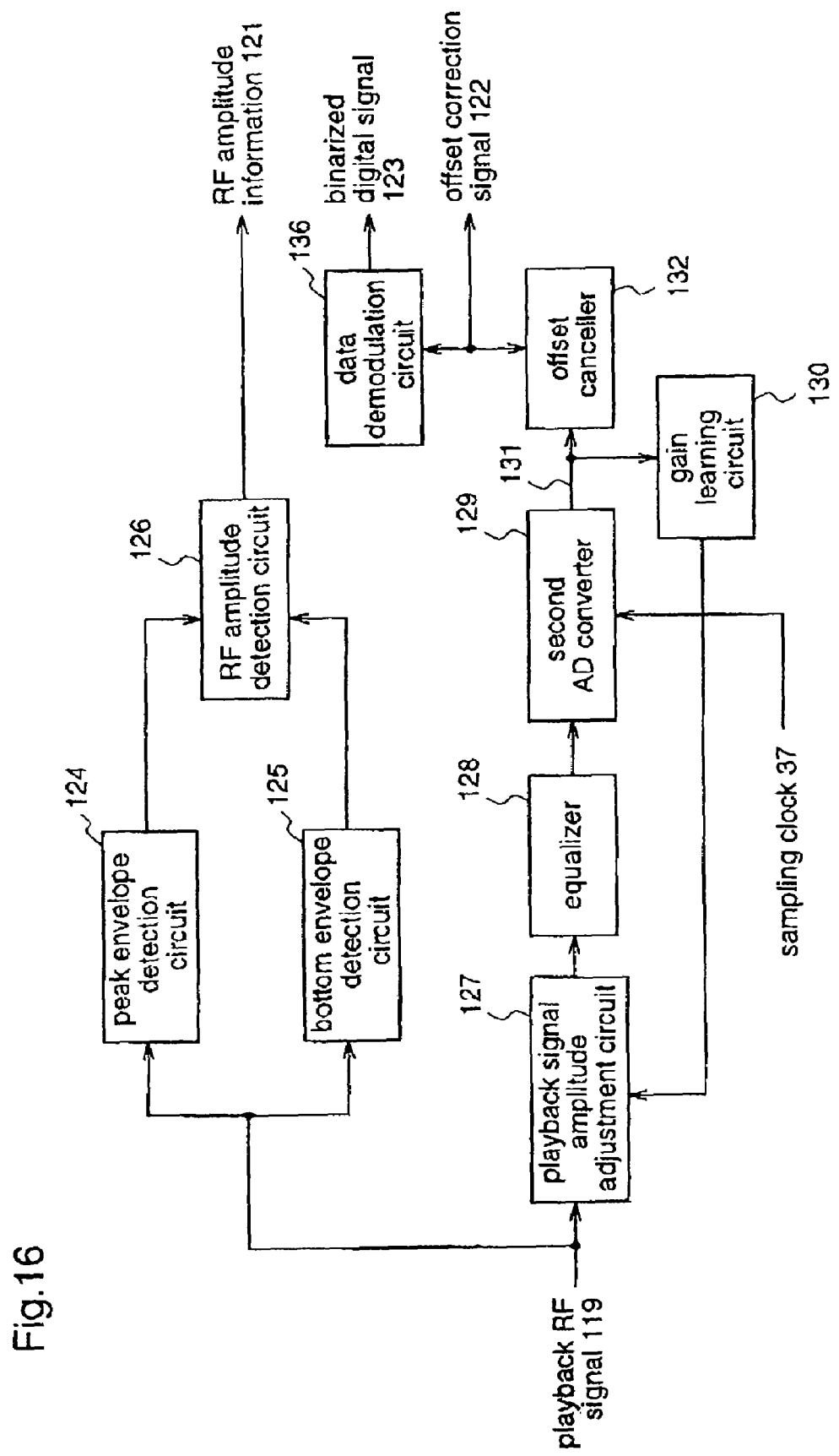
FIG. 16 is a block diagram illustrating the construction of a digital data reproduction circuit according to the first embodiment.

FIG. 16 is a block diagram illustrating the construction of the digital data reproduction circuit 120.

With reference to FIG. 16, a peak envelope detection circuit 124 detects a peak envelope of the playback RF signal 119. A bottom envelope detection circuit 125 detects a bottom envelope of the playback RF signal 119.

An RF amplitude detection circuit 126 is constituted by a differential amplifier or the like, and obtains a difference in voltages between the peak envelope outputted from the peak envelope detection circuit 124 and the bottom envelope outputted from the bottom envelope detection circuit 125, thereby generating RF amplitude information 121.

A playback signal amplitude adjustment circuit 127 is constituted by a VGA or the like which is able to vary the gain with a gain adjustment value that is learned by a gain learning circuit 130, and adjusts the playback RF signal 119 to an amplitude appropriate to the dynamic range of a second AD converter 129.

An equalizer 128 corrects the playback RF signal 119 whose output amplitude has been adjusted by the playback signal amplitude adjustment circuit 127 so as to emphasize the high frequency band of the signal, thereby removing noise components existing in bands other than a demodulated signal.

The second AD converter 129 converts the output signal of the equalizer 128, which is an analog signal, into a digital RF signal 131 as a multiple-bit digital signal at the timing of the sampling clock 37 generated by the clock generation circuit 36.

The gain learning circuit 130 has an AGC (Automatic Gain Control) function for automatically adjusting the gain of the playback signal amplitude adjustment circuit 127 so that a difference between the amplitude value that is obtained from the signal amplitude difference between an arbitrarily set target amplitude value and the peak envelope and bottom envelope of the digital RF signal 131.

An offset canceller 132 obtains the symbolic center of the waveform of the digital RF signal 131, and outputs an offset correction signal 122 in which an offset component in the amplitude direction which is included in the digital RF signal 131 is reduced. The detail of the offset canceller 132 will be described later.

A data demodulation circuit 136 demodulates the offset correction signal 122 into binarized digital signal 123, and outputs it to the optical disc controller 16.

Next, the operation of the digital data reproduction circuit 120 will be described.

The playback RF signal 119 is input to the peak envelope detection circuit, wherein a peak envelope of the playback RF signal 119 is detected. Likewise, the playback RF signal 119 is input to the bottom envelope detection circuit 125, wherein a bottom envelope of the playback RF signal 119 is detected. Next, the RF amplitude detection circuit 126 obtains a difference in voltages between the peak envelope from the peak envelope detection circuit 125 and the bottom envelope from the bottom envelope detection circuit 125, thereby generating RF amplitude information 121. The RF amplitude information 121 is input to the optical disc controller 16 to be fundamental information for controlling focus servo to be performed via the optical pickup drive circuit 18.

Figure 17:
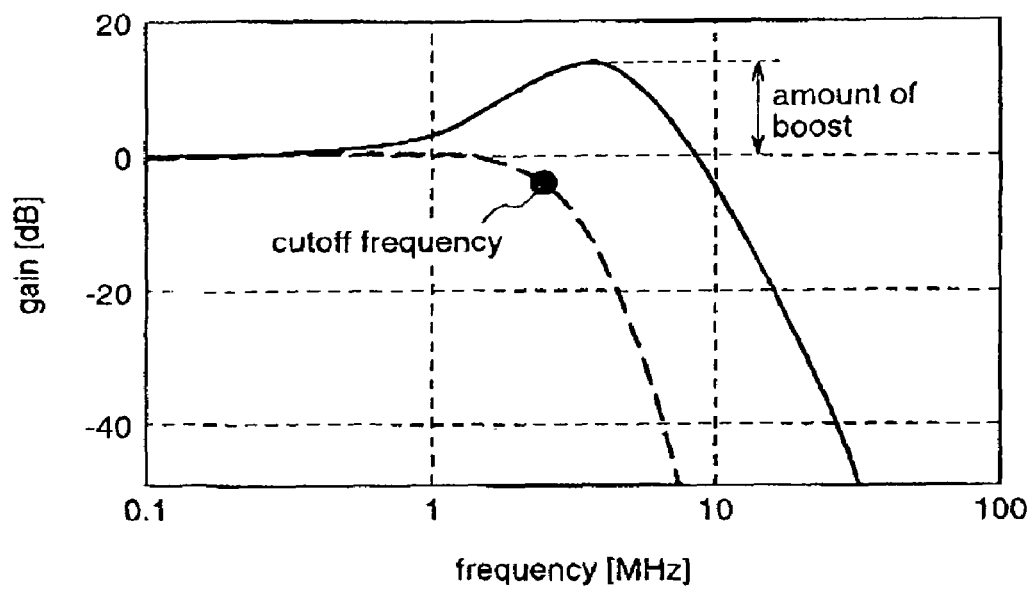
FIG. 17 is a diagram for explaining frequency characteristics of a high order ripple filter.

On the other hand, the playback RF signal 119 is also input to the playback signal amplitude adjustment circuit 127, and the playback signal amplitude adjustment circuit 127 adjusts the playback RF signal 119 to have an amplitude that is appropriate to the dynamic range of the second AD converter 129. There is a case where the recording density in the linear direction may be increased, depending on the patterns of adjacent recorded codes. In this case, amplitude attenuation in the playback waveform of the playback RF signal 119 becomes prominent in the high frequency component, leading to degradation in the jitter component possessed by the playback RF signal 119. Therefore, the equalizer 128 that tries to improve the jitter subjects the output signal of the playback signal amplitude adjustment circuit 127 to correction for emphasizing the high frequency band, and removes noise components that exist in bands other than the demodulated signal. The equalizer 128 is constituted by a filter for which the amount of boost and the cutoff frequency can be arbitrarily set. This filter may be a high order ripple filter or the like having frequency characteristics as shown by a solid line in FIG. 17. In FIG. 17, the characteristics shown by a dotted line are obtained when high-band boosting is not carried out.

The output signal of the equalizer 128 is input to the second AD converter 129, and converted into a digital RF signal 131 as a multiple-bit digital signal, at the timing of the sampling clock 37.

The gain learning circuit 130 automatically adjusts the gain of the playback signal amplitude adjustment circuit 127 so that a difference between an arbitrarily set target amplitude value and the amplitude value that is obtained from the signal amplitude difference between the peak envelope and bottom envelope of the inputted digital RF signal 131 becomes zero.

The digital RF signal 131 is input to the offset canceller 132, whereby the symbolic center of the waveform of the digital RF signal 131 is obtained, and the digital RF signal 131 is converted to an offset correction signal 122 in which the offset component in the amplitude direction included in the digital RF signal 131 is reduced.

Hereinafter, the specific circuit structure and operation of the offset canceller 132 will be described with reference to FIG. 18. The circuit structure shown in FIG. 18 is merely an example, and the present invention is not restricted thereto.

Figure 18:
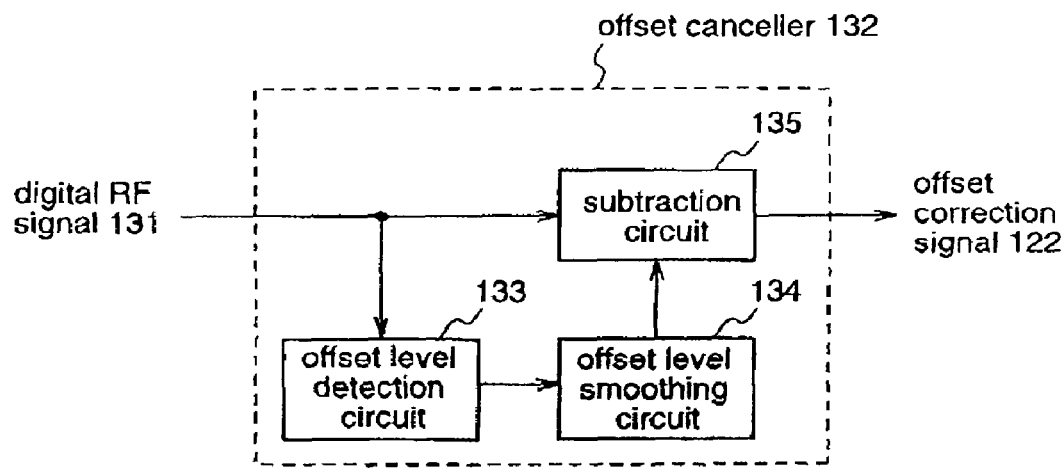
FIG. 18 is a block diagram illustrating the construction of an offset canceller included in the digital data reproduction circuit according to the first embodiment.

As shown in FIG. 18, the offset canceller 132 comprises an offset level detection circuit 133, an offset level smoothly circuit 134, and a subtraction circuit 135. The offset level detection circuit 133 detects the offset level information in the amplitude direction, of the digital RF signal 131. The subtraction circuit 135 subtracts the smoothed offset level information in the amplitude direction from the digital RF signal 131, thereby generating an offset correction signal 122.

Next, the operation of the offset canceller 132 will be described.

The digital RF signal 131 is input to the offset level detection circuit 133, and the offset level detection circuit 133 outputs phase information in the case where a zerocross position is determined from the digital RF signal 131, as center level variation information. Further, "+A" is added when the polarity of the digital RF signal is positive with reference to the zero level, and "−A" is added when it is negative (A: arbitrary integer), thereby accumulating these data. At this time, since the accumulated signal becomes information indicating the balance of symbolic polarity of the output signal from the offset canceller 132, offset information from the symbolic center level is extracted on the basis of this information. Next, the center level variation information and the symbolic polarity balance information are added at an arbitrary ratio, thereby generating offset level information. Thereby, it becomes possible to reduce the offset component in the amplitude direction which exists in the digital RF signal 131, leading to increase in the precision and performance of the phase sync control (PLL control) and data demodulation. The offset level smoothing circuit 134 smoothes the inputted offset level information in the amplitude direction, and outputs it to the subtraction circuit 135. The subtraction circuit 135 subtracts the smoothed offset level information in the amplitude direction, from the digital RF signal 131, whereby the offset component in the amplitude direction which is included in the digital RF signal 131 is reduced to generate an offset correction signal 122.

Next, the offset correction signal 122 is input to the data demodulation circuit 136. In order to demodulate the digital data recorded on the optical disc medium 1 and the address information carved particularly in the DVD-RAM disc, the data demodulation circuit 136 determines the value of the offset correction signal 122 to "1" or "0" according to whether the offset correction signal 122 is upper or lower than the center level shown in FIG. 19, thereby demodulating the binarized digital signal 123 to be input to the optical disc controller 16.

The above-mentioned CAPA area signal 39 that is generated by the optical disc controller 16 during recording/playback of the DVD-RAM disc outputs the address position information 61 detected by the address position detection circuit 76, in the state where the address information is not normally demodulated in the data demodulation circuit 136. On the other hand, in the state where the address information is normally demodulated, count is carried out with reference to the sampling clock 37 that is input to the optical disc controller 16 together with the binarized digital signal 123, and the CAPA area in the next sector and the gate signal at the estimated position are output from the detected address information. In this way, controlling the CAPA area signal 39 according to the playback state of the address information is advantageous in that detection of the address polarity information and the address position information becomes more stable in the state where the address information is normally obtained, and the phase of the clock component of the digital data recorded oil the optical recording medium is synchronized with the phase of the sampling clock.

On the other hand, the above-mentioned clock generation circuit 36 may be provided with a phase sync control circuit 146 in addition to the above-mentioned construction.

Hereinafter, the operation and principle of the clock generation circuit 36 provided with the phase sync control circuit 146 will be described with reference to FIGS. 19 and 22.

Figure 22:
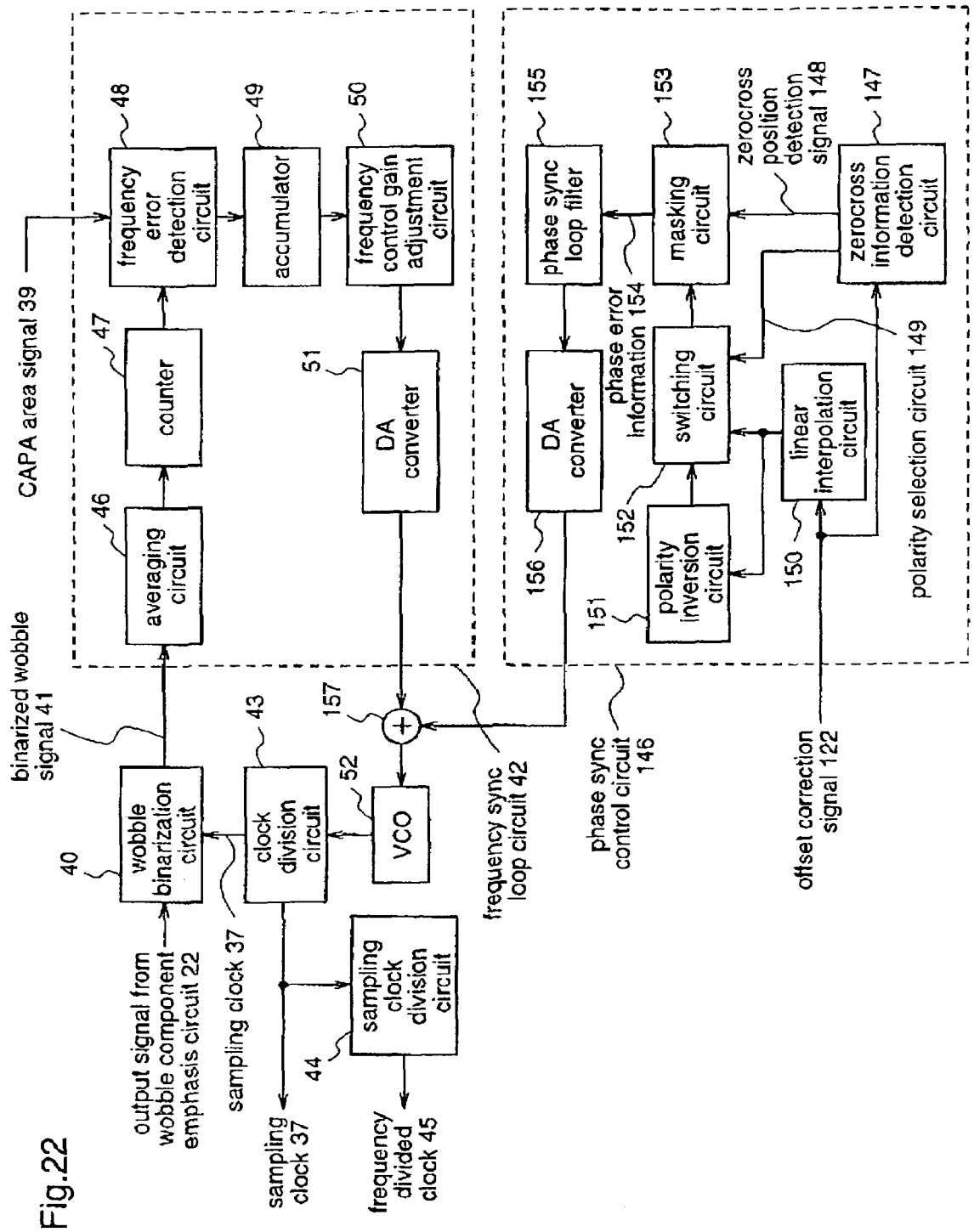
FIG. 22 is a block diagram illustrating the construction of the clock generation circuit having the phase sync control circuit according to the first embodiment.

FIG. 22 is a block diagram illustrating the construction of the clock generation circuit 36 provided with the phase sync control circuit 146.

In FIG. 22, a zerocross information detection circuit 147 generates a zerocross position detection signal 148, and a polarity selection signal 149 indicating whether the corresponding position is a rising edge or a falling edge, from the offset correction signal 122 as the output signal from the offset canceller 132.

A linear interpolation circuit 150 performs linear interpolation to the offset correction signal 122 to generate an intermediate signal.

A polarity inversion circuit 151 inverts the polarity of the output signal from the linear interpolation circuit 150.

A switching circuit 152 selects either the output signal of the polarity inversion circuit 151 or the output signal of the linear interpolation circuit, according to the polarity selection signal 149.

A masking circuit 153 outputs the output signal of the switching circuit 152 as phase error difference information 154, only when a zerocross position of the offset correction signal 122 is determined.

A phase sync loop filter 155 subjects the phase error difference signal 154 to filtering, thereby outputting a digital phase control signal.

A DA converter 156 converts the digital phase control signal outputted from the phase sync loop filter 155 into an analog control signal.

An addition circuit 157 adds the output signal of the frequency-control-side DA converter 51, and the output signal of the phase-sync-control-side DA converter 156.

The other constituents are identical to those shown in FIG. 8 and, therefore, repeated description is not necessary.

Next, the operation of the clock generation circuit 36 provided with the phase sync control circuit 146.

Figure 19:
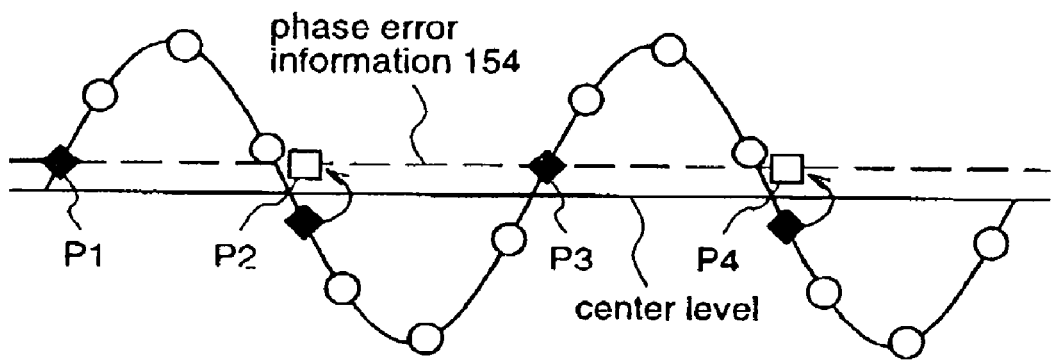
FIG. 19 is a diagram illustrating the principle of detecting phase error information by a clock generation circuit having a phase sync control circuit according to the first embodiment.

The output signal of the offset canceller 132 is input to the zerocross information detection circuit 147, and the zerocross information detection circuit 147 generates a zerocross position detection signal 148, and a polarity selection signal 149 indicating whether the position is a rising edge or a falling edge, from the output signal of the offset canceller 132 which is shown by white circles (○) in FIG. 19.

On the other hand, the output signal of the offset canceller 132 is also input to the linear interpolation circuit 150. The linear interpolation circuit 150 linearly interpolates adjacent white circles (○) with respect to the output signal of the offset canceller 132, thereby generating intermediate signals as shown by black squares (◆) in FIG. 19. This signal serves as a reference signal for the phase error signal. The polarity inversion circuit 151 inverts the polarity of the output signal from the linear interpolation circuit 150. The switching circuit 152 selects the signal outputted from the polarity inversion circuit 151, which is shown by white squares (□) in FIG. 19 when the polarity selection signal 149 indicates "negative", and selects the output signal of the linear interpolation circuit 150, which is shown by black squares (◆) in FIG. 19 when the polarity selection signal 149 indicates "positive".

The masking circuit 153 outputs the output signal of the switching circuit 152 as phase error information 154 only when it is determined that a zerocross position is detected on the basis of the zerocross position detection signal 148, i.e., only when it is determined that the polarity of the offset correction signal 122 is inverted. At this time, the phase error information 154 may be held not only at the instant of polarity change but until the next zerocross position. The phase error information 154 thus obtained is shown by "P1", "P2", "P3", and "P4" in FIG. 19. In FIG. 19, at the phase error information "P2" and "P4" corresponding to falling edges and shown by white squares (□), the switching circuit 152 selects the output signal of the polarity inversion circuit 151.

The phase sync loop filter 155 subjects the detected phase error information 154 to filtering, and outputs it as a digital phase control signal. The DA converter 156 converts the digital phase control signal into an analog control signal. The phase sync loop filter 155 may be constructed so as to adjust the gains of the proportional component and the integral component, and perform integration by mixing the respective components.

The addition circuit 157 adds the output signal of the DA converter 53, on the frequency control side and the output signal of the DA converter 156 on the phase sync control side, and the VCO 52 oscillates a clock on the basis of the output voltage of the addition circuit 157. The output clock of the VCO 52 is converted into a sampling clock 37 through the clock division circuit 43.

To be specific, in the clock generation circuit 36 provided with the phase sync control circuit 146, a main control loop is constituted by the second AD converter 129, the offset canceller 132, the phase sync control circuit 146, the addition circuit 157, the VCO 52, the clock division circuit 43, and the second AD converter 129, and feedback control is performed so that the phase error information 154 becomes zero, whereby the digital data reproduction circuit 120 can generate a digital RF signal 131 synchronized with the phase of the clock component of the channel bit frequency of the playback RF signal 119.

Accordingly, with respect to a disk which can detect a wobble signal component, represented by a DVD-RAM disk, a DVD-R disk, and a DVD-RW disk, it is possible to apply the frequency sync control based on the wobble signal component and the phase sync control based on the recorded digital data to the oscillation frequency control for the sampling clock 37. In the phase sync control state, the frequency sync control may be halted. Further, when no digital data are recorded, the oscillation frequency of the sampling clock 37 may be controlled by only the frequency sync control. On the other hand, as represented by a DVD-ROM disk, when no wobble signal component exists, it is desirable that the phase sync control is fundamentally carried out.

Further, since it is possible to detect the wobble amplitude information and the address information by the digital signal processing circuit that is driven by the sampling clock synchronized with the phase of the clock component of the digital data recorded on the optical disc medium, address detection can be carried out in the optimum condition during the phase sync state. Further, it becomes unnecessary to change the multiplier of the digital signal processing circuit according to the recording/playback speed, and it is useful as a circuit that can easily constitute a system when it is necessary to perform recording and playback at various speeds ranging from a low speed to a high speed. Especially, it is useful in realizing a low-price DVD-RAM disk recording/playback apparatus or a DVD recorder.

As described above, in the optical disc recording/playback apparatus according to the first embodiment, when detecting wobble amplitude information and address information from a DVD-RAM disk or the like on which the address information exists intermittently, and wobbles are carved along recording tracks, a push-pull signal is, subjected to processing suitable for detection of the wobble amplitude information and the address information, and thereafter, the push-pull signal is converted into a digital signal in a high frequency region by a clock synchronized with the recording speed, whereby the wobble amplitude information and the address information can be stably detected with accuracy from a low frequency component to a high frequency component. Therefore, even during high-speed recording, the laser power control can be optimized against variations due to the shape of the optical disc medium or flaws and stains on the recording surface, thereby realizing high-quality recording performance. Especially it is possible to realize high-speed recording and increase in precision of ROPC (Running Optimum Power Control) which ensures the quality of recorded data by performing optimum recording laser power control, even when a defect due to flaws and stains exists on the recording surface during recording.

Further, since it is not necessary to change the multiplier of the digital signal processing circuit according to the recording/playback speed, a system can be easily constituted when it is necessary to perform recording and playback at various speeds ranging from a low speed to a high speed. Especially the optical disc recording/playback apparatus is useful for realizing a low-price DVD-RAM disk recording/playback apparatus, and a DVD recorder. Further, when the optical disc recording/playback apparatus is implemented by using a semiconductor integrated circuit, the circuit scale and power consumption of the apparatus can be reduced.

Furthermore, it is possible to detect the wobble amplitude information and the address information by the digital signal processing circuit that is driven by the sampling clock synchronized with the phase of the clock component of the digital data recorded on the optical disc medium, whereby address detection can be carried out in the optimum condition during the phase sync state.

Furthermore, while in the first embodiment the optical disc medium 1 has the address information which is intermittently exists on the recording surface, the present invention is not restricted thereto. The present invention is applicable to every optical disc medium in which address information exists in wobbles that is carved along recording tracks. For example, when the present invention is applied to an optical disc medium in which address information is carved as LPP (Land PrePits), such as a DVD-R disk or a DVD-RW disk, the noise removal circuit 25 in the wobble component emphasis circuit 22 according to the first embodiment is further provided with a function of removing an LPP signal component in the push-pull signal 14, and the recording laser power is appropriately controlled on the basis of the amplitude information of the wobble signal component after the LPP signal component is reduced.

More specifically, when detecting a wobble signal component from an optical disc medium on which LPP exists, since a greater part of high-frequency projections that occur when the LPP is detected can be attenuated, only the wobble signal component can be easily extracted from the push-pull signal. Thereby, also when digital data are recorded on a DVD-R disk or a DVD-RW disk, the quality of the recorded digital data can be ensured by the above-mentioned optimization of the recording laser power. The application range is not restricted to the DVD-R and the DVD-RW, the present invention is also applicable to every optical disc medium on which wobbles are carved along recording tracks, such as a Blu-ray disk or the like.

APPLICABILITY IN INDUSTRY

An optical disc recording/playback apparatus according to the present invention has effects that, even when a defect due to flaws or stains exists on a recording surface of an optical recording medium, digital data can be recorded with a laser power appropriate for recording according to wobble amplitude information, and furthermore, recording can be carried out in a safe area away from the area where the defect exists. Therefore, it is applicable to a DVD-RAM drive for recording and playback, and a DVD recorder, which can ensure the quality of the recorded digital data.

Moreover, the optical disc recording/playback apparatus of the present invention is applicable as a backup device for important data because the quality of recorded digital data is ensured.

What is claimed is:

1. An optical disc recording/playback apparatus comprising:
   a laser oscillation circuit for generating laser light for recording/playback of digital data in/from an optical recording medium in which address information exists intermittently, and wobbles are carved along recording tracks;
   a first photodetector for detecting reflected light of the laser light from the optical recording medium, as four light signals into which the reflected light is divided along a track direction axis that is a digital data recording direction, and a radius direction axis that is perpendicular to the track direction axis;
   a light difference signal detection circuit for, among the tour outputs from the first photodetector which have been subjected to currently-to-voltage conversion, adding the outputs from two areas parallel to the track direction axis, and adding the outputs from the other two areas parallel to the track direction axis, and detecting a difference between the respective addition values to output a light difference signal;
   a second photodetector for detecting a focus error signal, which detects the reflected light of the laser light from the optical recording medium as a light signal that is divided into two along the radius direction axis that is perpendicular to the track direction axis;
   a playback signal detection circuit for detecting a playback RF (Radio Frequency) signal by using either the output of the first photodetector which has been subjected to current-to-voltage conversion or the output of the second photodetector which has been subjected to current-to-voltage conversion, or using both of the output of the first photodetector which has been subjected to current-to-voltage conversion and the output of the second photodetector which has been subjected to current-to-voltage conversion;
   an optical disc controller for transmitting/receiving data and commands to/from an external device, and controlling recording and playback in/from the optical recording medium;
   a recording gate signal generation circuit for generating a recording gate signal which indicates either a recording state indicating recording of the digital data or a playback state indicating playback of the digital data or the address information, on the basis of a command from the optical disc controller;
   a light difference signal shaping circuit for output two signals by performing different adjustments to the light difference signal on the basis of the different states indicated by the recording gate signal;
   a clock generation circuit for generating a sampling clock that is synchronized with a clock component included in the playback signal of the optical recording medium, from one of the output signals of the light difference signal shaping circuit;

a first analog-to-digital converter for converting the other output signal of the light difference signal shaping circuit into a digital sampling signal, by the sampling clock;

an address information preprocessing circuit for converting the digital sampling signal into an address information preprocessing signal for detecting the address information;

a wobble amplitude information preprocessing circuit for converting the digital sampling signal into a wobble amplitude information preprocessing signal for detecting wobble amplitude information as amplitude information of the wobbles;

an address information detection circuit for detecting address information from the address information preprocessing signal;

a wobble amplitude information detection circuit for detecting wobble amplitude information from the wobble amplitude information preprocessing signal;

a recording laser power control circuit for controlling a laser power generated by the laser generation circuit, during recording of digital data, in synchronization with variations in the wobble amplitude information, so that the quality of recorded data is appropriately maintained; and a digital data reproduction circuit for demodulating digital data from the playback RF signal on the basis of the sampling clock to obtain a binarized digital signal, and outputting the binarized digital signal to the optical disc controller.

2. An optical disc recording/playback apparatus as defined in claim 1 wherein said light difference signal shaping circuit comprises:
  a wobble component emphasis circuit for shaping the output signal of the light difference signal detection circuit so as to emphasize the wobble signal component;
  an amplitude adjustment circuit for adjusting the amplitude of the output signal of the light difference signal detection circuit; and
  a light difference signal selection circuit for selecting the output signal of the wobble component emphasis circuit when the recording gate signal indicates the recording state, end selecting the output signal of the amplitude adjustment circuit when the recording gate signal indicates the playback state;

said recording laser power control circuit comprises:
  a digital signal arithmetic processing circuit for generating recording laser power control information for controlling the laser power during recording of digital data;
  a wobble amplitude information transfer circuit for transferring the wobble amplitude information to the digital signal arithmetic processing circuit; and
  a recording laser power adjustment circuit for generating a recording laser power control pulse which changes the laser power during recording by the recording laser power control information synchronized with variations in the wobble amplitude information.

3. An optical disc recording/playback apparatus as defined in claim 2 wherein said wobble component emphasis circuit comprises:
  a noise removal circuit for removing noise components other than the frequency components of the wobbles which are formed on the optical recording medium; and
  a wobble amplitude adjustment circuit for amplifying the amplitude of the output signal of the noise removal circuit to an amplitude suited to an input dynamic range of the first analog-to-digital converter.

4. An optical disc recording/playback apparatus as defined in claim 2 wherein said light difference signal selection circuit includes an offset difference adjustment circuit for adjusting the offset levels of the output signal of the wobble component emphasis circuit and the output signal of the amplitude adjustment circuit so as to reduce a difference in offset levels in the amplitude direction between the output signal of the wobble component emphasis circuit and the output signal of the amplitude adjustment circuit.

5. An optical disc recording/playback apparatus as defined in claim 2 wherein said wobble amplitude information transfer circuit comprises:
  a transfer period flag generation circuit for varying a transfer cycle of the wobble amplitude information according to recording and playback speeds, and generating a transfer cycle flag for every transfer cycle;
  a wobble amplitude information holding circuit for holding the wobble amplitude information for every transfer cycle flag; and
  an intake signal generation circuit for generating an intake signal for taking the output signal of the wobble amplitude information holding circuit into the digital signal arithmetic processing circuit for every transfer cycle.

6. An optical disc recording/playback apparatus as defined in claim 5 wherein said wobble amplitude information transfer circuit includes a transfer cycle flag masking circuit for performing a masking process so that the transfer cycle flag generation circuit does not generate a transfer cycle flag when the recording gate signal indicates the playback state.

7. An optical disk recording/playback apparatus as defined in claim 2 wherein said clock generation circuit comprises:
  a wobble binarization circuit for converting the output of the wobble component emphasis circuit into binarized data;
  a frequency sync loop circuit to which the binarized data is input;
  a voltage controlled oscillator for varying a clock that is outputted according to a signal outputted from the frequency sync loop circuit; and
  a clock division circuit for arbitrarily dividing the clock outputted from the voltage controlled oscillator into M (M: positive integer) to output the sampling clock; and
  said frequency sync loop circuit controlling the clock outputted from the voltage controlled oscillator so that the clock is synchronized with a frequency corresponding to the channel bit of the digital data recorded on the optical recording medium or an arbitrary frequency that is N (N: positive integer) times as high as the frequency, on the basis of the frequency of the output signal of the wobble binarization circuit.

8. An optical disc recording/playback apparatus as defined in claim 7 wherein said digital data reproduction circuit comprises:
  a playback signal amplitude adjustment circuit for adjusting the amplitude of the playback RF signal;
  an equalizer for emphasizing a high frequency component of the output signal of the playback signal amplitude adjustment circuit to improve the jitter;
  a second analog-to-digital converter for converting the output signal of the equalizer into a digital RF signal by the sampling clock generated by the clock generation circuit;

an offset canceller for reducing an offset component in the amplitude direction from the digital RF signal; and a data demodulation circuit for demodulating the binarized digital signal by slicing the binarized digital signal from the output signal of the offset canceller by an arbitrary threshold value.

9. An optical disc recording/playback apparatus as defined in claim 8 wherein said clock generation circuit includes a phase sync control circuit for extracting phase error information from the output signal of the offset canceller, and synchronizing the phase of the sampling clock with the phase of the clock component possessed by the digital data recording on the optical recording medium.

10. An optical disc recording/playback apparatus as defined in claim 7 wherein said wobble amplitude information detection circuit comprises:

a peak detection circuit for detecting a peak envelope signal from the wobble amplitude information preprocessing signal;

a bottom detection circuit for detecting a bottom envelope signal from the wobble amplitude information preprocessing circuit;

a detection cycle generation circuit for determining detection cycles of the peak detection circuit and the bottom detection circuit so that the detection cycle for the wobbles becomes relatively long while the detection cycle for the address information becomes relatively short;

a first high frequency noise removal circuit for removing a high frequency noise component from the output signal of the peak detection circuit;

a second high frequency noise removal circuit for removing a high-frequency noise component from the output signal of the bottom detection circuit; and a wobble amplitude detection circuit for detecting the wobble amplitude information from a difference between the first high frequency noise removal circuit and the second high frequency noise removal circuit.

11. An optical disc recording/playback apparatus as defined in claim 10 wherein said detection cycle generation circuit comprises:

a first cycle setting circuit and a second cycle setting circuit for setting detection cycles of the peak detection circuit and the bottom detection circuit;

a cycle set value selection circuit for selecting an output value of the first cycle setting circuit when the recording gate signal indicates the playback state, and selecting an output value of the second cycle setting circuit when the recording gate signal indicates the recording state; and a detection cycle flag generation circuit for performing counting with the sampling clock, and resetting the count every time the count reaches the output value of the cycle set value selection circuit.

12. An optical disc recording/playback apparatus as defined in claim 10 wherein said clock generation circuit further includes a sampling clock division circuit for dividing the sampling clock into N (N: positive integer) to generate a frequency divided clock;

said peak detection circuit has a function of holding and outputting, with the frequency divided clock, the peak detection result obtained by detecting a peak envelope by the sampling clock on the basis of the wobble amplitude information preprocessing signal;

said bottom detection circuit has a function of holding and outputting, with the frequency divided clock, the bottom detention result obtained by detecting a bottom envelope by the sampling clock on the basis of the wobble amplitude information preprocessing signal; and said first high frequency noise removal circuit, said second high frequency noise removal circuit, said wobble amplitude detection circuit, and said wobble amplitude information transfer circuit are operated on the basis of the frequency divided clock.

13. An optical disc recording/playback apparatus as defined in claim 9 wherein said wobble amplitude information detection circuit comprises:

a peak detection circuit for detecting a peak envelope signal from the wobble amplitude information preprocessing signal;

a bottom detection circuit for detecting a bottom envelope signal from the wobble amplitude information preprocessing circuit;

a detection cycle generation circuit for determining detection cycles of the peak detection circuit and the bottom detection circuit so that the detection cycle for the wobbles becomes relatively long while the detection cycle for the address information becomes relatively short;

a first high frequency noise removal circuit for removing a high frequency noise component from the output signal of then peak detection circuit;

a second high frequency noise removal circuit for removing a high-frequency noise component from the output signal of the bottom detection circuit; and a wobble amplitude detection circuit for detecting the wobble amplitude information from a difference between the first high frequency noise removal circuit and the second high frequency noise removal circuit.

14. An optical disc recording/playback apparatus as defined in claim 13 wherein said detection cycle generation circuit comprises:

a first cycle setting circuit and a second cycle setting circuit for setting detection cycles of the peak detection circuit and the bottom detection circuit;

a cycle set value selection circuit for selecting an output value of the first cycle setting circuit when the recording gate signal indicates the playback state, and selecting an output value of the second cycle setting circuit when the recording gate signal indicates the recording state; and a detection cycle flag generation circuit for performing counting with the sampling clock, and resetting the count every time the count reaches the output value of the cycle set value selection circuit.

15. An optical disc recording/playback apparatus as defined in claim 13 wherein said clock generation circuit further includes a sampling clock division circuit for dividing the sampling clock into N (N: positive integer) to generate a frequency divided clock;

said peak detection circuit has a function of holding and outputting, with the frequency divided clock, the peak detection result obtained by detecting a peak envelope by the sampling clock on the basis of the wobble amplitude information preprocessing signal;

said bottom detection circuit has a function of holding and outputting, with the frequency divided clock, the bottom detection result obtained by detecting a bottom envelope by the sampling clock on the basis of the wobble amplitude information preprocessing signal; and said first high frequency noise removal circuit, said second high frequency noise removal circuit, said wobble amplitude detection circuit, and said wobble amplitude information transfer circuit are operated on the basis of the frequency divided clock.

16. Au optical disc recording/playback apparatus as defined in claim 1 wherein said address information preprocessing circuit comprises:

a first signal amplitude attenuation circuit for attenuating the signal amplitude of the digital sampling signal with an arbitrary attenuation rate; and an address information state selection circuit for selecting the digital sampling signal when the recording gate signal indicates the playback state, and selecting the output signal of the first signal amplitude attenuation circuit when the recording gate signal indicates the recording state.

17. An optical disc recording/playback apparatus as defined in claim 1 wherein said wobble amplitude information preprocessing circuit comprises:

a second signal amplitude attenuation circuit for attenuating the signal amplitude of the digital sampling signal with an arbitrary attenuation rate; and a wobble amplitude information state selection circuit for selecting the digital sampling signal when the recording gate signal indicates the recording state, and selecting the output signal of the second signal amplitude attenuation circuit when the recording gate signal indicates the playback state.

18. An optical disc recording/playback apparatus as defined in claim 1 further includes a function of, when a defect due to flaws or stains exists on the digital data recording surface of the optical recording medium, specifying an area of the defect on the basis of the wobble amplitude information, halting the recording operation on the area, and resuming recording from impaired data, into an area after the defect, which area seems to be safe.

19. An optical disc recording/playback apparatus as defined in claim 1 wherein, on the optical recording medium, address information exists in the wobbles which are carved along the recording tracks.

20. An optical disc recording/playback apparatus as defined in claim 3 wherein:

on the optical recording medium, address information exists in the wobbles which are carved along the recording tracks; and said noise removal circuit further has a function of removing an LPP (Land PrePit) signal component other than a wobble frequency component.

21. An optical disc recording/playback apparatus as defined in claim 1 further including:

a high frequency removal filter for removing a high frequency component from the output signal of the light difference signal detection circuit, and outputting the signal as a tracking error signal; and an optical pickup drive circuit for driving an optical pickup comprising said laser generation circuit, said first photodetector, and said second photodetector, on the basis of a command from the optical disc controller.

* * * * *

UNITED STATES PATENT AND TRADEMARK OFFICE
CERTIFICATE OF CORRECTION

| | | |
|---|---|---|
| PATENT NO. | : 7,558,171 B2 | Page 1 of 1 |
| APPLICATION NO. | : 11/269586 | |
| DATED | : July 7, 2009 | |
| INVENTOR(S) | : Youichi Ogura et al. | |

It is certified that error appears in the above-identified patent and that said Letters Patent is hereby corrected as shown below:

In column 40, claim 1, line 26, "among the tour outputs" should read --among the four outputs--.

In column 40, claim 1, line 27, "been subjected to currently-to-voltage" should read --been subjected to current-to-voltage--.

In column 41, claim 2, line 44, "recording state, end selecting" should read --recording state, and selecting--.

In column 42, claim 6, line 34, "An optical disk recording" should read --An optical disc recording--.

In column 43, claim 12, line 67, "the bottom detention result" should read --the bottom detection result--.

In column 44, claim 13, line 25, "signal of then peak" should read --signal of the peak--.

In column 45, claim 16, line 3, "Au optical disc" should read --An optical disc--.

Signed and Sealed this

Ninth Day of February, 2010

David J. Kappos
*Director of the United States Patent and Trademark Office*